(12) United States Patent
Russell

(10) Patent No.: US 9,004,120 B2
(45) Date of Patent: Apr. 14, 2015

(54) WHEEL SYSTEM

(76) Inventor: Brian A. Russell, Littleton, CO (US)

( * ) Notice: Subject to any disclaimer, the term of this patent is extended or adjusted under 35 U.S.C. 154(b) by 411 days.

(21) Appl. No.: 13/287,847

(22) Filed: Nov. 2, 2011

(65) Prior Publication Data

US 2012/0279622 A1 Nov. 8, 2012

Related U.S. Application Data

(63) Continuation-in-part of application No. 12/503,296, filed on Jul. 15, 2009, now Pat. No. 8,127,809.

(60) Provisional application No. 61/081,249, filed on Jul. 16, 2008.

(51) Int. Cl.
*B60B 9/10* (2006.01)
*B60B 9/26* (2006.01)

(52) U.S. Cl.
CPC .............. *B60B 9/26* (2013.01); *B60B 2310/56* (2013.01)

(58) Field of Classification Search
CPC .............. B60B 9/00; B60B 9/02; B60B 9/10; B60B 9/14
USPC ........... 152/1, 5–8, 17–18, 20, 30, 40–42, 44, 152/47–50
See application file for complete search history.

(56) References Cited

U.S. PATENT DOCUMENTS

| | | |
|---|---|---|
| 863,827 A | 8/1907 | Alloatti |
| 976,762 A | 11/1910 | Wible |
| 1,012,331 A | 12/1911 | Cunningham |
| 1,024,091 A | 4/1912 | Martin et al. |
| 1,054,444 A | 2/1913 | Olivier |
| 1,066,784 A | 7/1913 | Barrett |
| 1,123,529 A | 1/1915 | Harlan |
| 1,134,291 A | 4/1915 | Spencer |
| 1,213,834 A | 1/1917 | Bunzlau et al. |
| 1,233,462 A | 7/1917 | Frommann |
| 1,312,582 A | 8/1919 | Schneible |
| 1,319,726 A | 10/1919 | Schramm |
| 1,350,370 A | 8/1920 | Leviston et al. |
| 1,403,115 A | 1/1922 | Golein |
| 1,447,365 A | 3/1923 | Walther |
| 1,449,920 A | 3/1923 | Stanley |
| 1,519,971 A | 12/1924 | Hale |
| 1,555,479 A | 9/1925 | Morand |
| 1,646,480 A | 10/1927 | Harpstrite |
| 1,650,271 A | 11/1927 | Harpstrite |
| 1,684,596 A | 9/1928 | Patch |
| RE23,161 E | 10/1949 | MacLean |
| 4,573,510 A | 3/1986 | Ippen et al. |
| 5,372,170 A | 12/1994 | Hynes |

(Continued)

FOREIGN PATENT DOCUMENTS

GB 12249 0/1906

OTHER PUBLICATIONS

International Search Report and Written Opinion of PCT/US2009/050871 mailed on Sep. 1, 2009, 7 pages.

*Primary Examiner* — Jason Bellinger
(74) *Attorney, Agent, or Firm* — Knobbe Martens Olson & Bear LLP

(57) ABSTRACT

A wheel assembly includes a rim, a rib surrounding and radially spaced apart from the rim, and a resilient member that engages the rib. The resilient member is tied to the rim, such that the rim is resiliently held in relation to the round rib at least in part by tension in the resilient member.

23 Claims, 21 Drawing Sheets

(56) References Cited

U.S. PATENT DOCUMENTS

| | | |
|---|---|---|
| 6,701,985 B2 | 3/2004 | Russell |
| 6,732,775 B1 | 5/2004 | Kikuchi et al. |
| 6,782,930 B2 | 8/2004 | Kikuchi et al. |
| 7,104,297 B2 | 9/2006 | Russell |
| 8,127,809 B2 * | 3/2012 | Russell .......................... 152/40 |

* cited by examiner

B-B

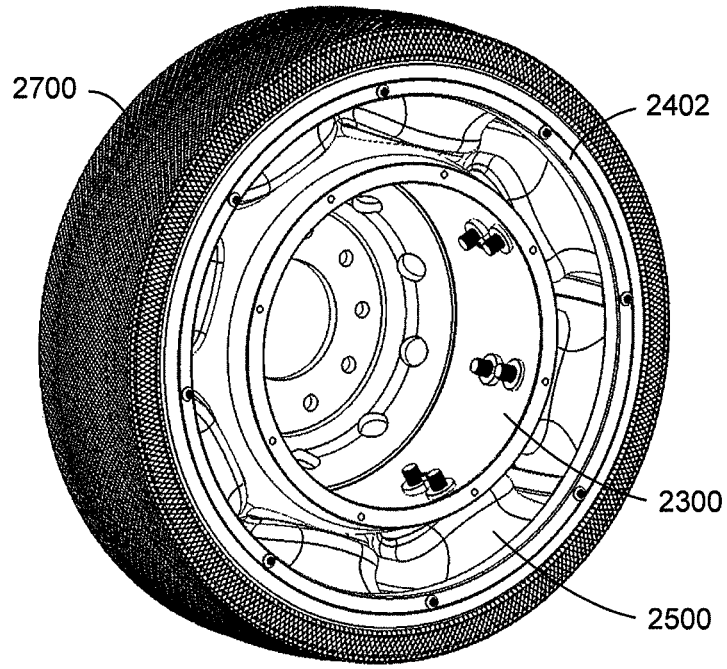
FIG. 28
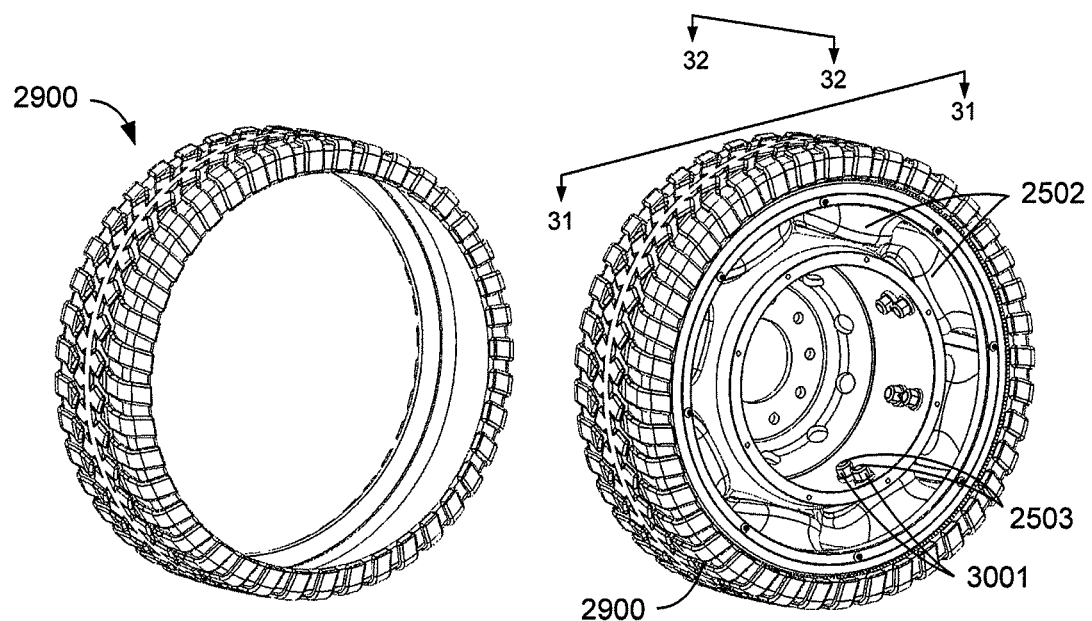
FIG. 29
FIG. 30

WHEEL SYSTEM

This application is a continuation-in-part of U.S. patent application Ser. No. 12/503,296, filed Jul. 15, 2009 and titled "Energy Efficient Wheel System", now U.S. Pat. No. 8,127,809, which claims priority from U.S. Provisional Patent Application No. 61/081,249, filed Jul. 16, 2008 and titled "Energy Efficient Wheel System", the entire disclosures of which are hereby incorporated by reference herein for all purposes.

BACKGROUND OF THE INVENTION

Wheeled vehicles have been in use for centuries, and wheel construction has evolved as materials, manufacturing methods, and performance needs have evolved. Pneumatic (air filled) tires have been the norm for most vehicles in the United States for most of the past century.

It is estimated that at highway speeds, about seven percent of the energy content in a car's fuel is expended simply in overcoming rolling resistance. Given that up to 69 percent of the energy content is lost in a car's engine during highway driving, about 22 percent of the useful mechanical energy produced by the car's engine may be expended in overcoming rolling resistance. Much of that rolling resistance is due to energy expended in deformation of the car's tires. Because the tires are viscoelastic, and not perfectly elastic, not all of the energy required to deform the tire is returned when the deformed part of the tire regains its shape. One portion of the tire that deforms is the sidewall. There is accordingly a need to reduce energy dissipated in tire sidewall deformation.

Pneumatic tires have the further disadvantage that they can be punctured and deflated by road hazards and the like. With most pneumatic tires, a tire puncture necessitates an immediate, inconvenient and costly repair.

BRIEF SUMMARY OF THE INVENTION

According to one aspect, a wheel assembly comprises a rim having a rim peripheral portion and defining an axis of rotation, and a round rib surrounding and radially spaced apart from the rim. A resilient member is disposed around the rim and engages the round rib. The resilient member includes a resilient member peripheral portion and one or more protruding portions, and the resilient member peripheral portion is held from the rim by the round rib, while the one or more protruding portions protrude toward the rim. The wheel assembly also includes a plurality of tying members. Each tying member connects one of the one or more protruding portions of the resilient member to the rim, such that the rim is resiliently held in relation to the round rib at least in part by tension in the one or more protruding portions of the resilient member. In some embodiments, the wheel assembly comprises two round ribs, the one or more protruding portions of the resilient member protruding between the two round ribs toward the rim. The wheel assembly may further comprise a round hoop member surrounding and in contact with the resilient member. The hoop member may be crowned. In some embodiments, the wheel assembly further comprises a traction layer surrounding and in contact with the round hoop member. In some embodiments, the hoop member has two outer edges separated by a width of the hoop member, the width being measured in the direction of the axis of rotation, and the wheel assembly further comprises two wedge members interposed between the hoop member and the traction layer proximate the respective edges of the hoop member, each wedge member being circular and having a wedge-shaped cross section. The wheel assembly may further comprise a flexible annular side curtain connected to one of the ribs and to the rim. The wheel assembly may comprise a pair of flexible annular side curtains, each connected to a respective rib and to a respective side of the rim. Each side curtain may include reinforcing fibers. The reinforcing fibers may be disposed near each surface of the respective side curtain, in an opposing angled configuration. The space between the side curtains may be held below atmospheric pressure. In some embodiments, the wheel assembly comprises a plurality of pre-tensioned reinforcing members embedded within the hoop member. The pre-tensioned reinforcing members may comprise carbon fiber. In some embodiments, the two round ribs are connected at intervals, and the one or more protruding portions of the resilient member protrude between the ribs and between the connections of the two ribs.

According to another aspect, a method of constructing a wheel assembly includes providing a rim, the rim having a rim peripheral portion and defining an axis of rotation, and providing a round rib and disposing it around and radially spaced apart from the rim. A resilient member is also provided, the resilient member having a resilient member peripheral portion and one or more protruding portions. The method also includes disposing the resilient member around the rim and engaging the round rib such that the resilient member peripheral portion is held from the rim by the round rib, and the one or more protruding portions protrude toward the rim. The method further includes providing a plurality of tying members, and connecting the tying members to the one or more protruding portions of the resilient member and to the rim, such that the rim is resiliently held in relation to the round rib by tension in the one or more protruding portions of the resilient member. In some embodiments, the method further comprises providing a second round rib and disposing it around and radially spaced apart from the rim, and disposing the resilient member such that the one or more protruding portions of the resilient member protrude between the two round ribs toward the rim. The method may further comprise providing a round hoop member, and disposing the round hoop member around and in contact with the resilient member. In some embodiments, the method includes providing a traction layer, and disposing the traction layer around and in contact with the round hoop member. The hoop member may have two outer edges separated by a width of the hoop member, the width being measured in the direction of the axis of rotation, and the method may further comprise providing two wedge members, each wedge member being circular and having a wedge-shaped cross section, and disposing the two wedge members between the hoop member and the traction layer proximate the respective edges of the hoop member. In some embodiments, the method includes providing a pair of flexible annular side curtains, and connecting each side curtain to a respective rib and to a respective side of the rim. The space between the side curtains may be at least partially evacuated. In some embodiments, the method includes embedding a plurality of pre-tensioned reinforcing members within the hoop member.

According to another aspect, a wheel assembly comprises a rim defining an axis of rotation, a round rib surrounding and radially spaced apart from the rim, and a resilient member disposed around the rim and engaging the round rib. The resilient member includes a resilient member peripheral portion and an inner portion, and the resilient member peripheral portion is held from the rim by the round rib, and the inner portion extends toward the rim. The wheel assembly also includes a plurality of tying members, each tying member connecting the inner portion of the resilient member to the rim, such that the rim is resiliently held in relation to the round rib at least in part by tension in the resilient member.

BRIEF DESCRIPTION OF THE DRAWINGS

FIG. 28 shows the hoop member of FIG. 27 disposed around and in contact with the resilient member of FIG. 25.

FIG. 29 illustrates a traction layer, in accordance with embodiments.

FIG. 30 illustrates the traction layer of FIG. 29 disposed around and in contact with the hoop member of FIG. 27.

DETAILED DESCRIPTION OF THE INVENTION

Figure 1A:
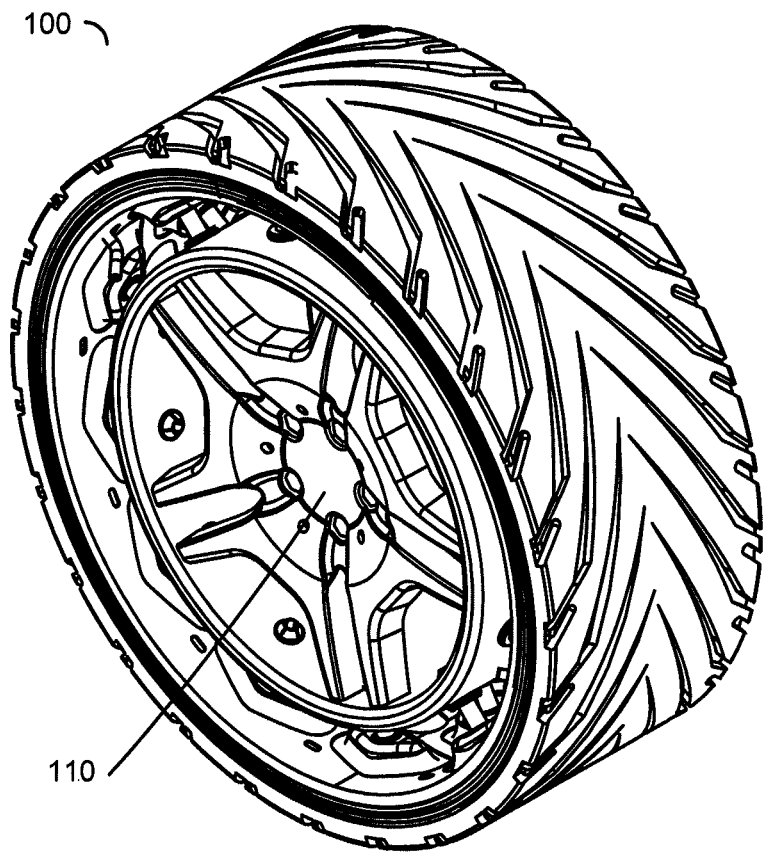
FIGS. 1A and 1B show a vehicle wheel assembly in accordance with one embodiment.
Figure 1B:
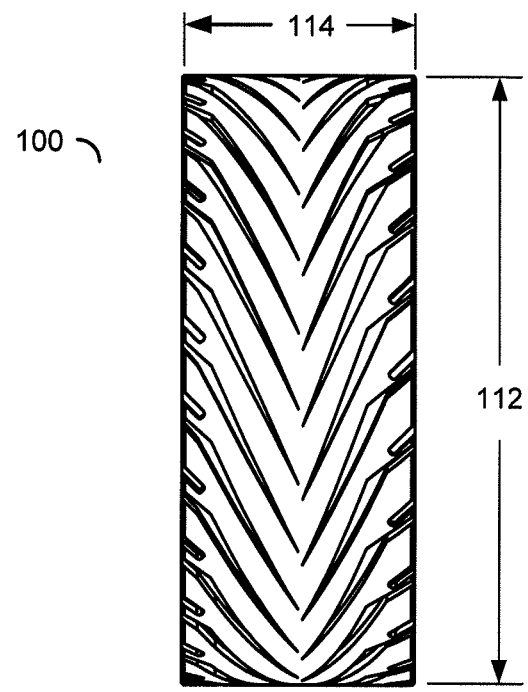

FIGS. 1A and 1B show a vehicle wheel assembly 100 in accordance with an example embodiment of the invention. Wheel assembly 100 is constructed in a manner that avoids the use of sidewalls, and therefore also avoids sidewall deformation. Wheel assembly 100 includes a hub 110 configured so that wheel assembly 100 can be mounted on a vehicle. Wheel assembly 100 may be produced in a variety of sizes for use on a variety of vehicles or other wheeled conveyances, for example, passenger cars, trucks, carts, vans, motorcycles, scooters, tractors, wheelbarrows, and other kinds of motorized or nonmotorized vehicles or conveyances. In one embodiment, wheel assembly 100 has a diameter 112 ranging from about 20 inches to about 36 inches, and a width 114 ranging from about six inches to about 15 inches. In a particular embodiment, diameter 112 is about 28 inches and width 114 is about 12 inches. One of skill in the art will recognize that many other dimensional combinations are within the scope of the claims, and that a wheel assembly such as wheel assembly 100 may be produced in different sizes to accommodate different vehicles and uses. Wheel assembly 100 is made up of several components, which will be described in conjunction with additional figures.

Figure 2:
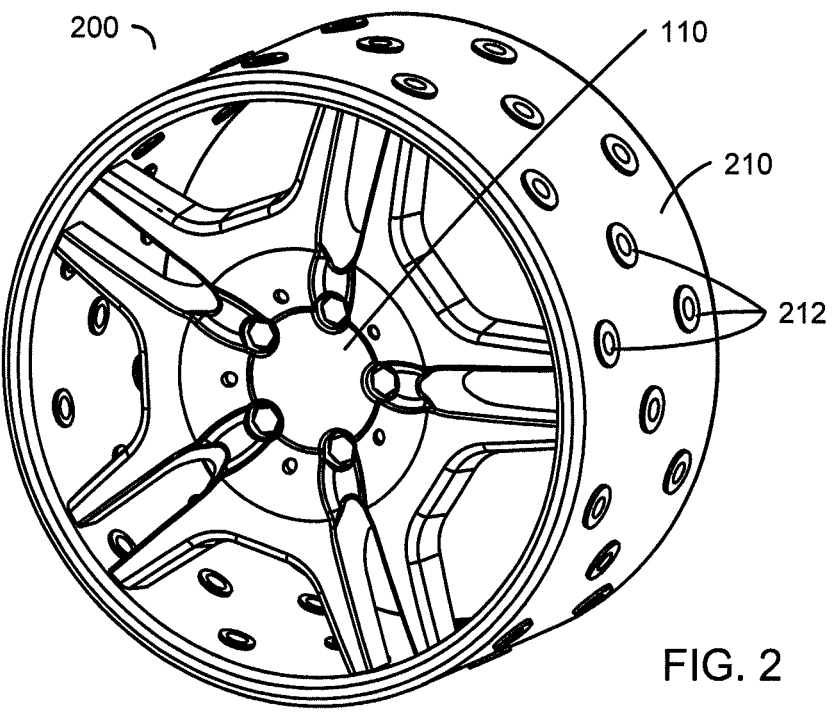
FIG. 2 shows a rim that is part of a wheel assembly, in accordance with one embodiment.

FIG. 2 shows a rim 200 that may be part of wheel assembly 100, in accordance with one embodiment. In FIG. 2, rim 200 comprises hub 110, and also comprises a round peripheral portion 210. In this example, peripheral portion 210 is substantially cylindrical. It should be understood that the term "substantially cylindrical" is used so as to allow imperfect cylinders to be included with the described subject matter since most manufacturers will include some imperfections from a perfect cylinder, and to encompass shapes that depart somewhat from perfectly cylindrical shapes, for example to include attachment features, crowning, and the like. In other embodiments, peripheral portion 210 may be curved or crowned. In one preferred embodiment, rim 200 is made of cast aluminum with some surfaces machined so as to maintain certain manufacturing tolerances, but other materials and processes may be used to produce a rim in accordance with embodiments of the invention. For example, rim 200 may be made of cast iron, may be assembled from sheet steel, may be molded from a polymer with or without reinforcing additives, may be made of an alloy of metals, may be made of a composite such as a fiber reinforced composite, or may be made using other materials or processes. Rim 200 may be made using combinations of materials and processes. Peripheral portion 210 may have a uniform thickness, may include draft to facilitate casting or molding, may include features such as bosses 212 that facilitate assembly of wheel assembly 100, or may include any combination of these and other features.

Figure 3:
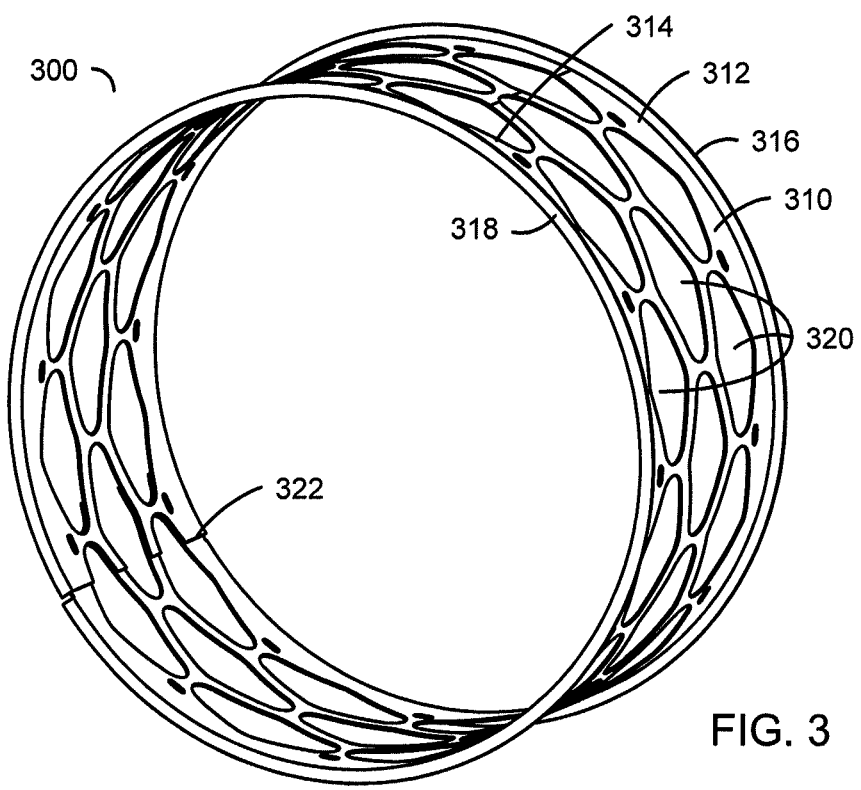
FIG. 3 shows a hoop member, in accordance with one embodiment.
Figure 4:
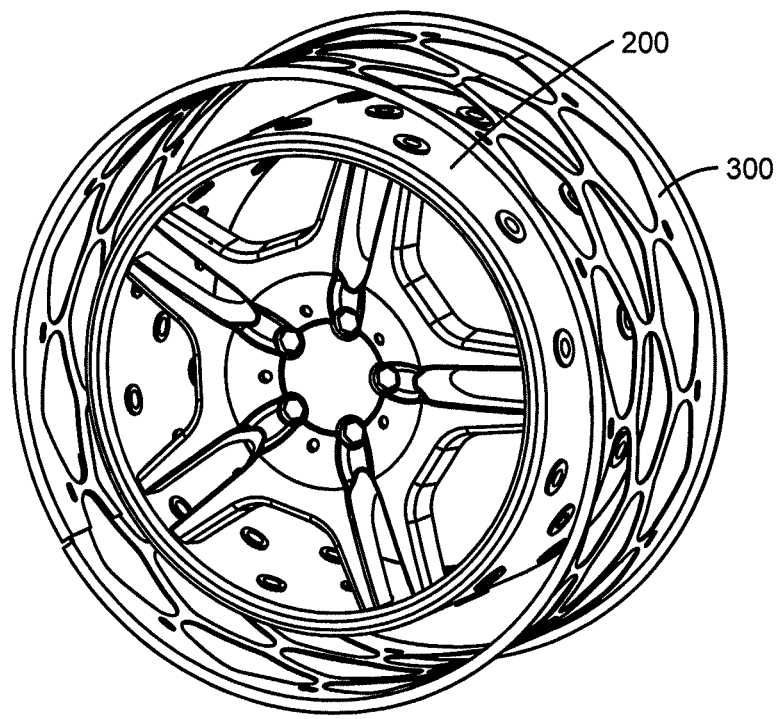
FIG. 4 shows a stage in the assembly of a wheel assembly, in accordance with one embodiment.

FIG. 3 shows a hoop member 300, in accordance with one embodiment. (In some embodiments, a second hoop member may be present, and hoop member 300 is a first hoop member.) Hoop member 300 has a round main portion 310 bounded by edges 312 and 314. In this example, main portion 310 is substantially cylindrical. Example hoop member 300 also comprises flanges 316 and 318 extending outward from edges 312 and 314. The main portion 310 has a plurality of access openings 320 disposed about its circumference. The purpose of access openings 320 will be explained below. Preferably, the edges of the access openings are deburred, beveled, or rounded so as to reduce stress concentrations in material that may come into contact with the edges later in the assembly of wheel assembly 100. While access openings 320 are shown as diamond-shaped, other shapes may be used. For example, access openings 320 may be of some other polygonal shape, or may be round, elliptical, or have some other curved outline. Access openings 320 need not all have the same shape. The diameter of hoop member 300 is somewhat larger than the diameter of rim 200, so that member 300 can be disposed around rim 200 and remain spaced apart from rim 200. This arrangement is shown in FIG. 4. Example hoop 300 also comprises a split 322. Split 322 allows hoop 300 to be compressed, reducing its diameter temporarily to enable further assembly of wheel assembly 100. First hoop member 300 may be made of any suitable material strong enough for the application in which wheel assembly 100 will be used, including cast aluminum, sheet aluminum, sheet steel, a molded or formed polymer, a composite, or another kind of material. In one embodiment, first hoop member 300 is made of sheet steel about 0.050 to about 0.500 inches thick. While example hoop member 300 is shown having three rows of 12 access openings 320 per row, with the middle row angularly offset from the outer two rows, other configurations are possible.

More or fewer access openings 320 may be provided, in more or fewer rows, or in any desired arrangement depending on the performance requirements and application for which a particular wheel assembly is intended.

Figure 5A:
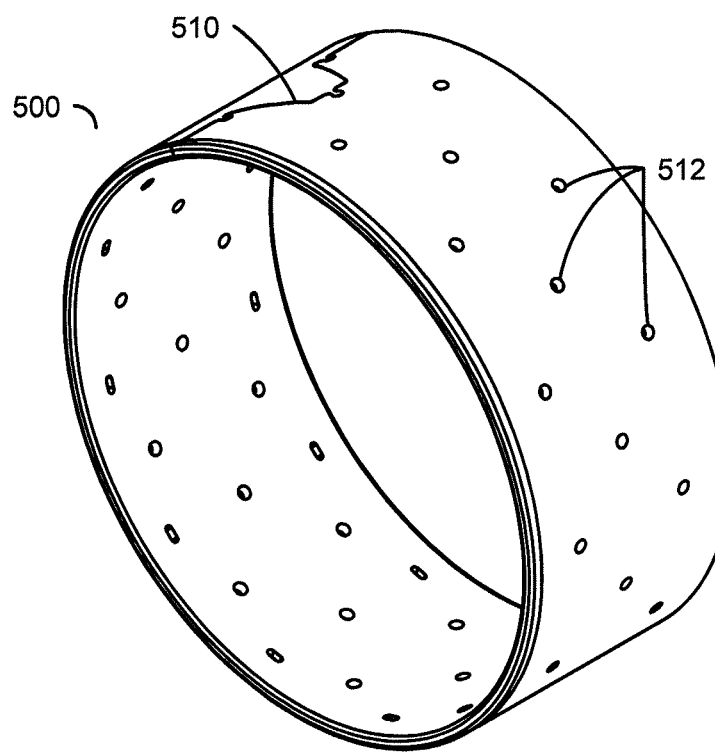
FIG. 5A shows a resilient member, in accordance with one embodiment.

FIG. 5A shows a resilient member 500, in accordance with one embodiment. Resilient member 500 can be made of a highly elastic polymer, such as a natural or synthetic molded rubber, or may be made of another flexible material, such as a metal alloy having good energy return characteristics. Many materials are possible. In one embodiment, resilient member 500 is made of natural gum rubber. In other embodiments, resilient member 500 may be made of a natural or synthetic elastomer impregnated with a filler, such as carbon nanotubes. Resilient member 500 may be formed as a monolithic piece, or fabricated in a strip and joined at a joint such as joint 510 shown in FIG. 5A. In some embodiments, resilient member 500 may have a thickness of about 0.125 to about 1.500 inches. In some embodiments, resilient member 500 may have a plurality of attachment holes 512 that are substantially centered on access openings 320 in first hoop member 300 in a later assembly step. Resilient member 500 may sometimes be referred to as a "membrane."

Figure 5B:
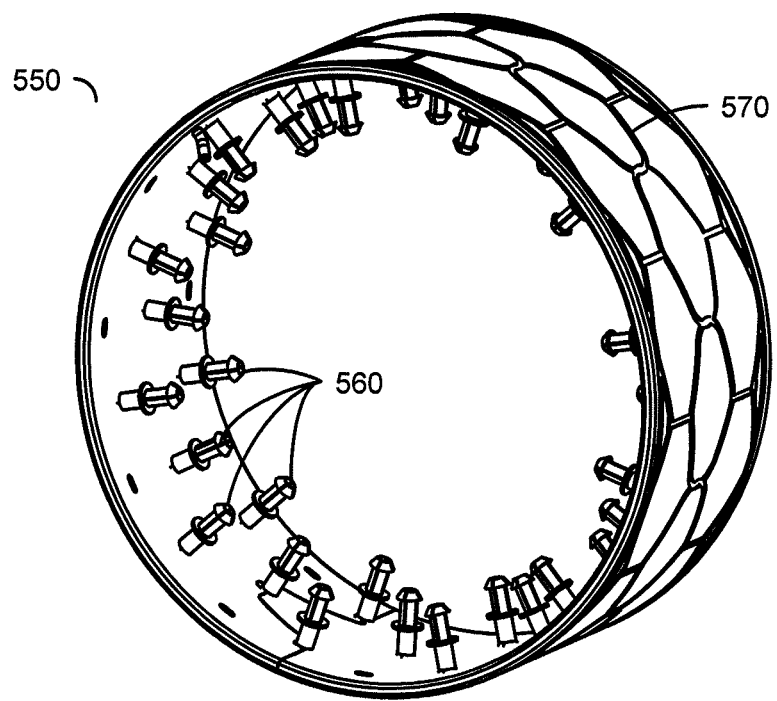
FIG. 5B shows a resilient member, in accordance with another embodiment.
Figure 6:
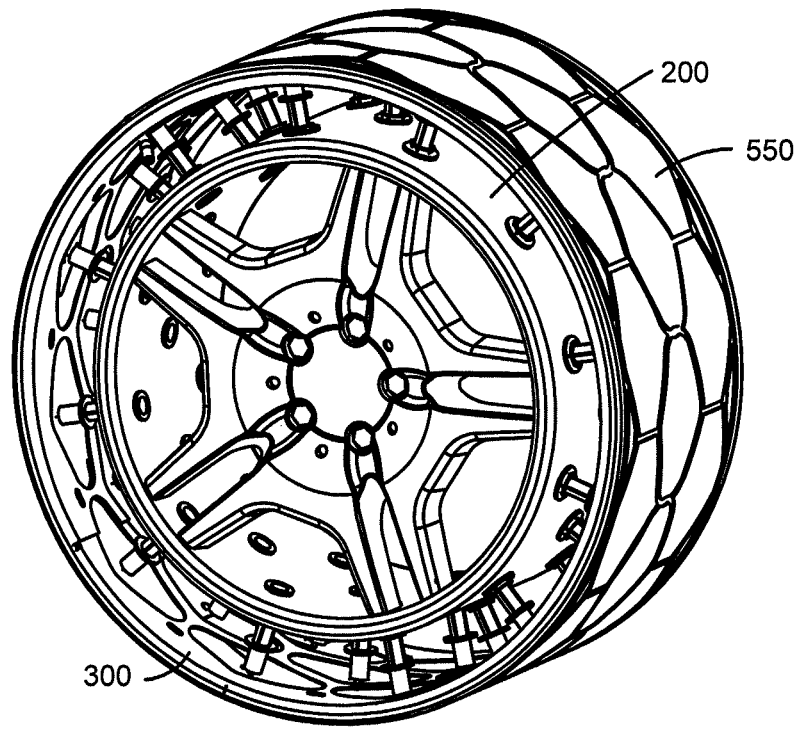
FIG. 6 shows another stage in the assembly of a wheel assembly, in accordance with one embodiment.

FIG. 5B shows a resilient layer 550 in accordance with another embodiment. In this embodiment, a plurality of tying members 560 are molded into resilient layer 550. The function of tying members 560 and channels 570 will be explained below. Other features may be molded into a resilient member such as resilient member 500 or resilient member 550 as well. For example, features for engaging with tying members 560, assembly reference features, or other features may be included, and such features may protrude into or through access openings 320 when the resilient member is in its initial relaxed state. Resilient member 500 or 550 is disposed around and in contact with the outside surface of the main portion of hoop member 300. If hoop member 300 has flanges such as flanges 316 and 318, then resilient member 500 may reside at least partially between the flanges. This arrangement is shown in FIG. 6. As an alternative to molding tying members 560 into the resilient layer, tying members may be inserted into attachment holes 512 of a resilient layer such as example resilient layer 500 shown in FIG. 5A.

Many arrangements are possible. While example resilient member 500 is shown as originally having a uniform thickness, this is not a requirement. For example, features may be molded or otherwise formed in resilient member for receiving the tying members. The features may include portions raised from the outer surface of resilient member 500, features raised on the inside surface of resilient member 500, or both.

Figure 7:
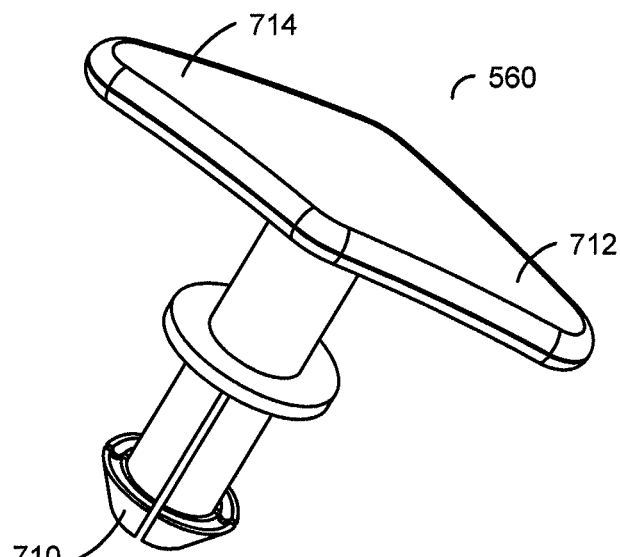
FIG. 7 shows a tying member, in accordance with one embodiment.

FIG. 7 shows a tying member 560, in accordance with one embodiment. Tying member 560 comprises a first attachment at a first end 710 for engaging rim 200. In the example of FIG. 7, the attachment is a snap that is configured to snap into a hole in the peripheral portion 210 of rim 200, but other attachment methods could be used. For example, tying member 560 could include a threaded end that is configured to thread into a threaded hole in rim 200, or tying member 560 could be threaded and protrude through a hole in rim 200 and be affixed by a nut. Many other attachment methods are possible. At a second end 712, tying member 560 comprises a flange 714 for engaging resilient member 500. Flange 714 may be large enough to avoid pulling through resilient member 500, and have rounded edges to avoid stress concentrations. While example flange 714 is shown as diamond shaped, other shapes may be used, including round, elliptical, or other curved or polygonal shapes. Tying member 560 may be made of any suitable material, such as aluminum, steel, or another metal, or a polymer such as polycarbonate, nylon, or other suitable materials. One tying member 560 may be provided for each access opening in hoop member 300. (One of skill in the art will recognize that the assembly of wheel assembly 100 may proceed in a different order than is being described. For example, it may be preferable to position hoop member 300, resilient member 500, and tying members 560 with each other, and then place rim 200 inside that subassembly. Other assembly orders are possible.)

Figure 8:
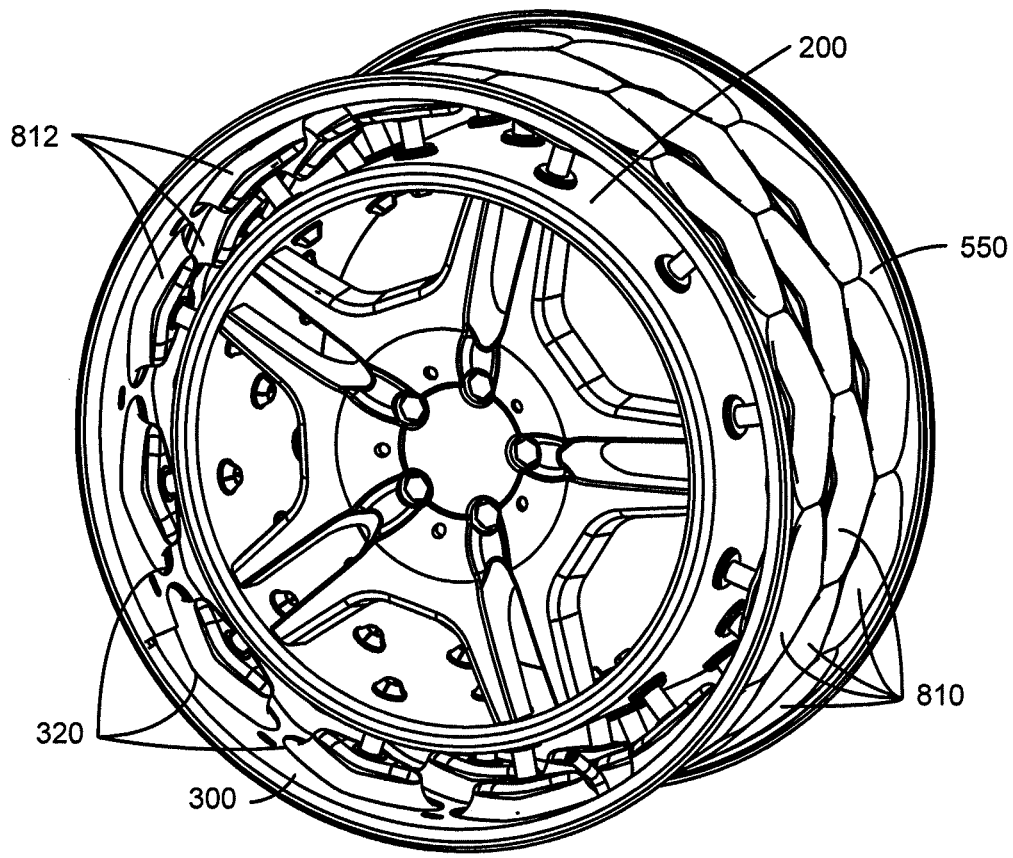
FIG. 8 shows another stage in the assembly of a wheel assembly, in accordance with one embodiment.

With rim 200, hoop member 300, resilient member 500, and tying members 560 in position, tying members 560 may be urged toward rim 200 and engage with rim 200. This arrangement is shown in FIG. 8. After engagement, each tying member flange 714 is then contained in a recess 810 and is submerged below the outer surface of resilient member 500.

Each tying member causes a portion 812 of resilient member 500 to protrude into or through one of the access openings 320 in hoop member 300. In other embodiments, as will be explained in more detail below, features molded or formed into resilient member 500 may protrude to some degree into or through access openings 320 even before tying members 560 are engaged with rim 200, but the engagement of tying members 560 with rim 200 causes further protrusion or extension of resilient member 500. It will be appreciated that in this unloaded condition, each tying member 560 is in tension, and rim 200 is suspended, substantially centered in the assembly, by tying members 560. The urging of tying members 560 to engagement with rim 200 may be accomplished by a press, by special tooling, by the novel method described below, or by any other suitable method.

Figure 9:
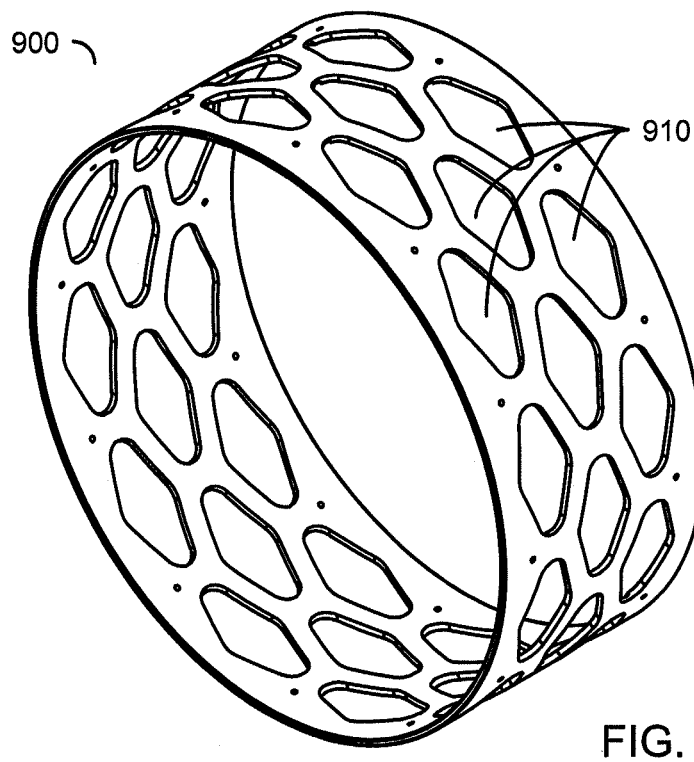
FIG. 9 shows a second hoop member, in accordance with one embodiment.
Figure 10:
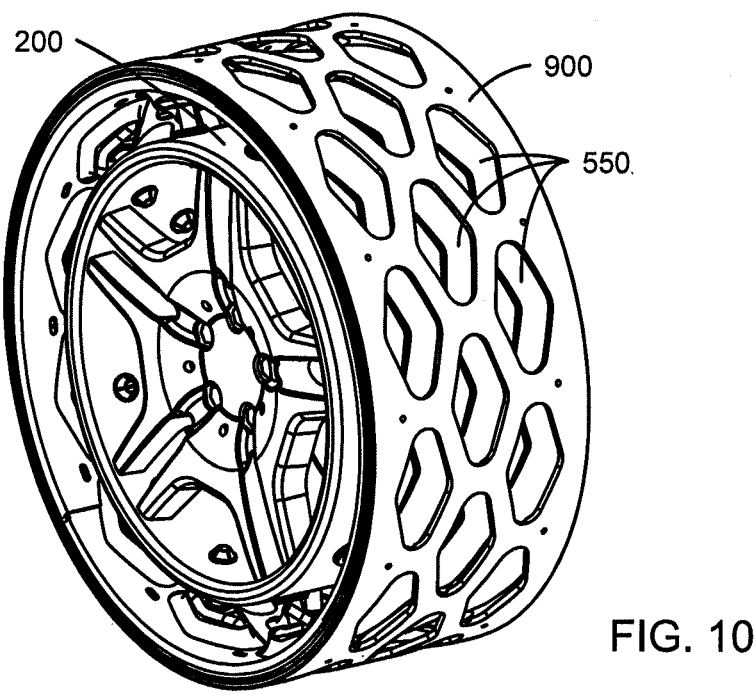
FIG. 10 shows another stage in the assembly of a wheel assembly, in accordance with one embodiment.

FIG. 9 shows a second hoop member 900, in accordance with one embodiment. Second hoop member 900 is round, and sized to fit around the outside of resilient member 500. Second hoop member 900 is substantially cylindrical in this embodiment. Second hoop member 900 may sometimes be called an actuator. Hoop member 900 may be made of any suitable material, including aluminum, steel, a polymer, a composite, or another kind of material. In one embodiment, second hoop member 900 is made of sheet steel about 0.050 to about 0.500 inches thick. Second hoop member 900 may optionally have access holes 910 that may provide access to tying members 560 for assembly, depending on the kinds of fasteners used with tying members 560. Preferably, access holes 910 align radially with access openings 320 in first hoop member 300. Access holes 910 may be diamond shaped, as shown, or may have any of a variety of other shapes, and need not all be of the same shape. Second hoop member 900 is disposed around the outside surface of resilient member 500. This arrangement is shown in FIG. 10.

Figure 11:
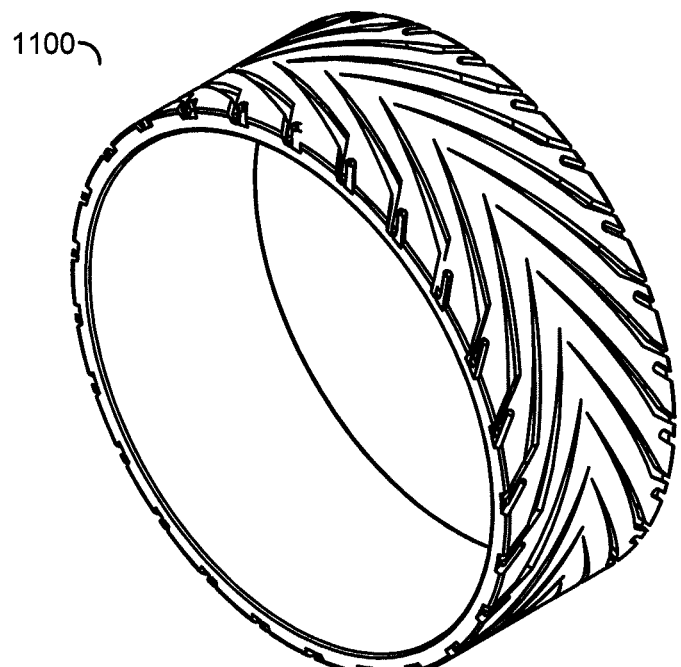
FIG. 11 shows a traction layer, in accordance with one embodiment.

FIG. 11 shows a fraction layer 1100, in accordance with an example embodiment of the invention. Traction layer 1100 is preferably made of a hard, durable rubber or other semiflexible material. In one embodiment, traction layer 1100 is made of tire rubber. In another embodiment, traction layer 1100 may be impregnated with a filler, for example carbon nanotubes. Traction layer 1100 may include various fillers or reinforcing agents or structures. Traction layer 1100 is shown with a particular tread pattern, but one of skill in the art will recognize that other tread patterns may be used, or traction layer 1100 may be formed without a tread pattern. Traction layer 1100 is disposed around second hoop member 900 to complete the assembly of wheel assembly 100, shown in FIG. 1. In some embodiments, traction layer 1100 may have a thickness of about 0.25 to about 1.50 inches. While example traction layer has been shown as having uniform thickness (other than the tread pattern), this is not a requirement. For example, the center of traction layer 1100 may be made thicker than the edges.

While second hoop member 900 and traction layer 1100 are depicted as separate items and described as separately assembled into wheel assembly 100, it is intended that the claims encompass the case where second hoop member 900 and traction layer 1100 are formed together as a subassembly and then disposed around resilient member 500. For example, second hoop member 900 may be insert molded into traction layer 1100 to form a subassembly that is then affixed to resilient member 500.

Second hoop member 900 and traction layer 1100, either separately or together, may be fixed into wheel assembly 100 using adhesives, chemical bonding, heat welding, lamination, stitching, solvent bonding, or any other suitable attachment method.

Figure 12:
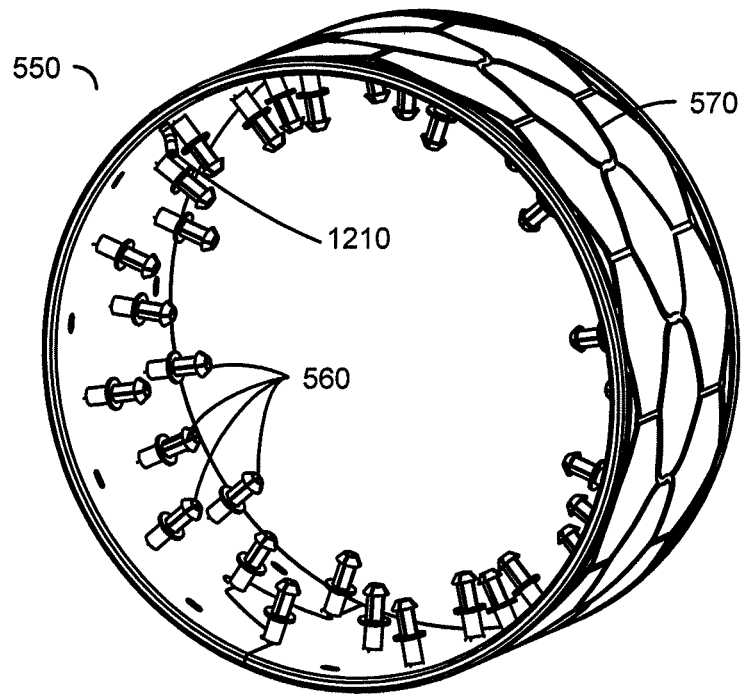
FIG. 12 shows a resilient member, in accordance with one embodiment.

FIG. 12 shows resilient member 550, in accordance with another example embodiment. Resilient member 550 comprises a network of channels 570 in its outer surface. The channels provide a pathway interconnecting the hollow spaces formed between recesses 810 and second hoop member 900 or fraction layer 1100. In a wheel assembly using this resilient member embodiment, access holes (such as access holes 910 shown in FIG. 9) may not be provided in the second hoop member. A valve stem 1210 may be affixed to resilient member 500, configured to admit air or another gas to the network of channels. Valve stem 1210 may comprise a Schrader valve, or another kind of air valve. This arrangement is useful during the assembly of wheel assembly 100 to urge portions of resilient member 550 to protrude through access openings 320, thereby engaging tying members 560 with rim 200 for attachment. Preferably, in order to use this assembly method, resilient member 550 is hermetically sealed at its edges to second hoop member 900 or traction layer 1100. After assembly, the network of channels and recesses 810 may be left in their pressurized state, the pressure may be relieved, or the channels and recesses may be evacuated. While channels 570 are shown in a particular configuration in FIG. 12, one of skill in the art will recognize that many other configurations are possible. For example, the channels may be formed in a geometric or other pattern that places the channels over openings 320 in first hoop member 300.

Figure 13:
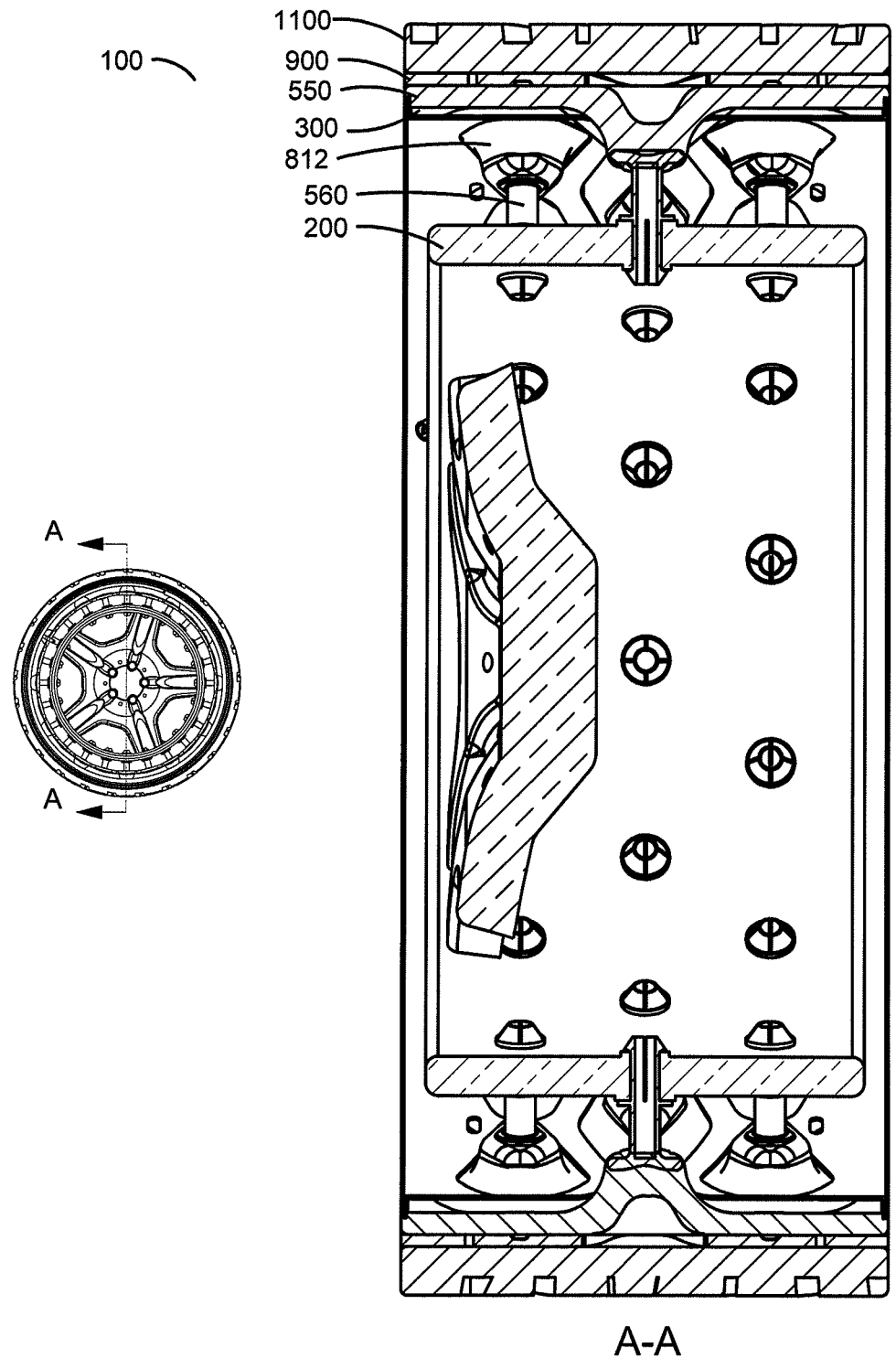
FIG. 13 shows a cross section of the example wheel assembly of FIG. 1 in its assembled state.

FIG. 13 shows a cross section of wheel assembly 100 in its assembled state. As is shown in FIG. 13, first hoop member 300 surrounds rim 200. Resilient member 550 surrounds and is in contact with first hoop member 300. Tying members 560 connect resilient member 550 to rim 200, pulling protruding portions 812 through openings in hoop member 300. Second hoop member (actuator) 900 surrounds resilient member 550, and is in turn surrounded by traction layer 1100.

Figure 14:
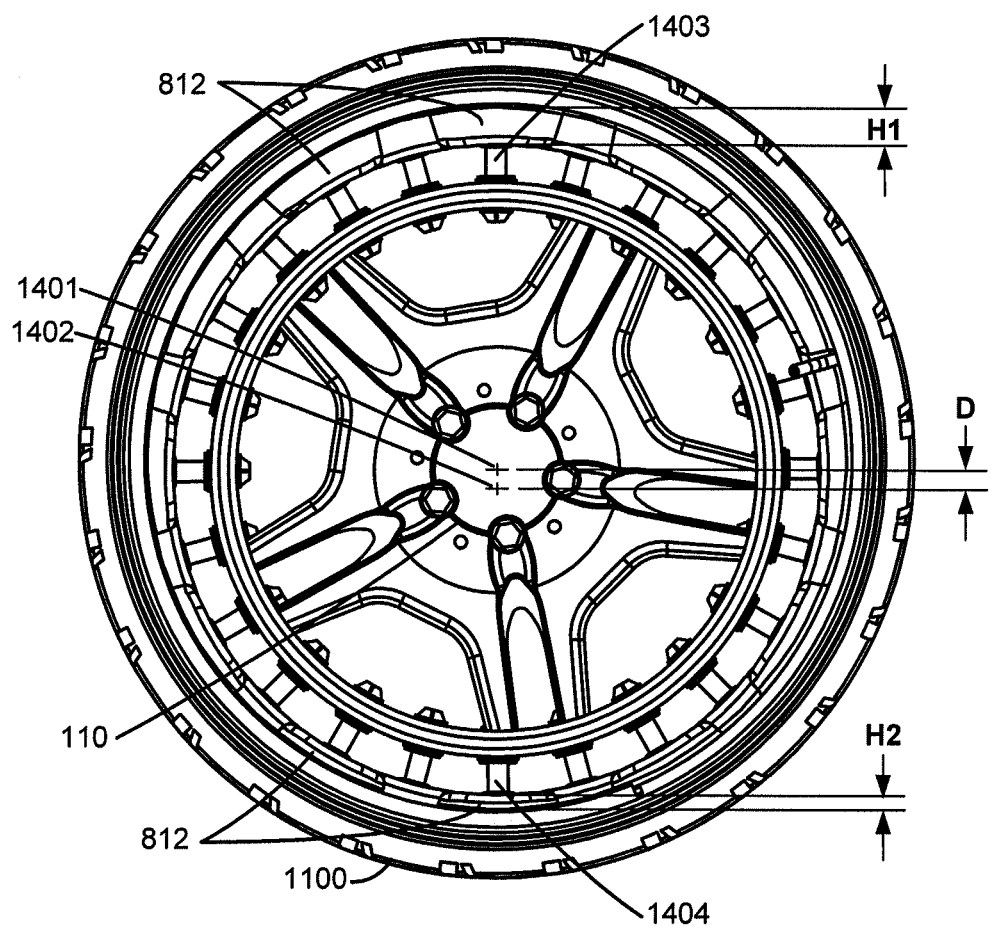
FIG. 14 shows a side view of the example wheel assembly of FIG. 1 in a loaded condition.

FIG. 14 shows a side view of example wheel assembly 100 in a loaded condition, for example after it has been mounted on a vehicle (not shown) and is supporting at least a portion of the vehicle's weight. Center point 1401 shows the location of the center of the circle formed by the circumference of traction layer 1100. Center point 1402 shows the location of the center of hub 110. Center point 1402 has been displaced downward from center point 1401 by the distance D. This displacement can also be seen in the variation in the apparent heights of protruding portions 812. At the top of wheel assembly 100, protruding portions 812 protrude by a distance of about H1, while at the bottom of wheel assembly 100, protruding portions 812 protrude by only a distance of about H2, which is smaller than H1. The weight of the vehicle has displaced hub 110 downward, and resilient member 500 has limited the displacement D by virtue of its elastic resistance to deformation. Hub 110 may be thought of as hanging from the top of wheel assembly 100, rather than being pushed up from the bottom of the wheel assembly. This overall compliance of wheel assembly 100 provides a cushioning capability so that wheel assembly 100 can absorb bumps and other road irregularities.

In FIG. 14, particular tying member 1403, near the top of wheel assembly 100, has displaced its corresponding protruding portion 812 such that it protrudes by a distance of about H1. The protruding portion corresponding to particular tying member 1404, near the bottom of wheel assembly 100, protrudes by only about a distance H2. After wheel assembly has rolled one half revolution clockwise, for example if the vehicle on which wheel assembly 100 is mounted moves to the right, particular tying member 1404 will be near the top of wheel assembly 100, and will distend its corresponding protruding portion so that it protrudes by a distance of about H1. Correspondingly, particular tying member 1403 will be near the bottom of wheel assembly 100, and its corresponding protruding portion will protrude by a distance of only about H2. During rolling of wheel assembly 100, the various tying members will thus by turns reach the top of wheel assembly 100, where they bear the largest portion of the weight of the vehicle, and will by turns reach the bottom of wheel assembly 100.

Figure 15:
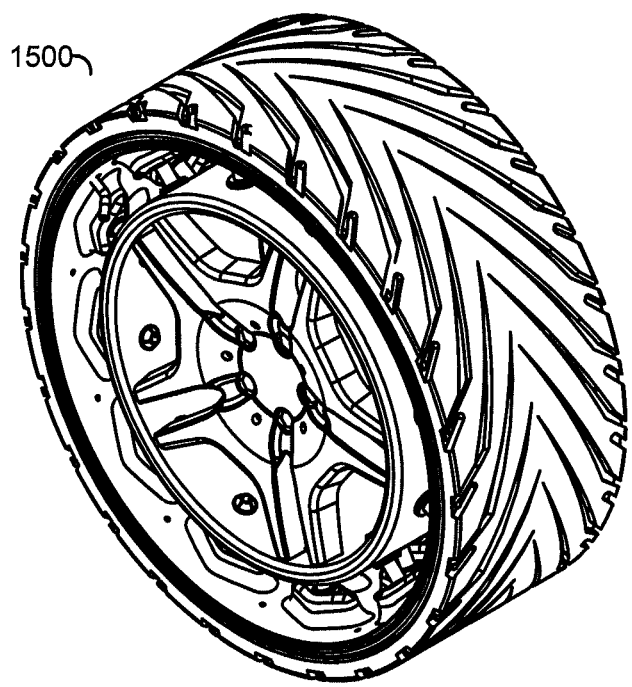
FIG. 15 shows a wheel assembly in accordance with another embodiment.

FIGS. 15-18 show the assembly of another embodiment. FIG. 15 shows a completed wheel assembly 1500 in accordance with this embodiment. Wheel assembly 1500 may comprise fewer parts than wheel assembly 100, and its fabrication may be somewhat simplified.

Figure 16:
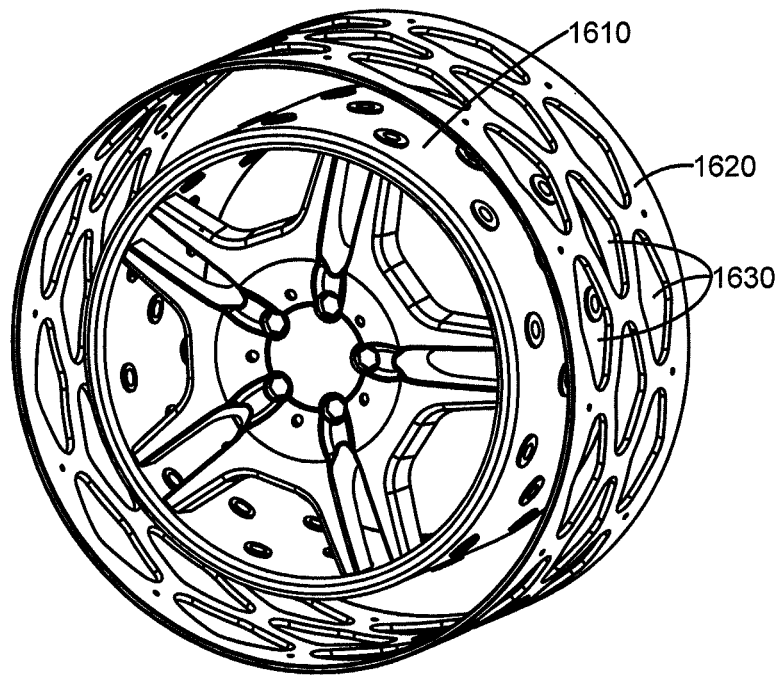
FIG. 16 shows a stage in the assembly of the wheel assembly of FIG. 15, in accordance with one embodiment.

FIG. 16 shows some parts of wheel assembly 1500 in a partially assembled state. Rim 1610, which may be similar to rim 200, is surrounded by a hoop member, also called a single actuator, 1620, which may be similar to second hoop member or actuator 900, but may be somewhat thicker. Hoop member 1620 may be made of any suitable material, including for example aluminum, steel, a polymer, a composite, or another kind of material. In one embodiment, hoop member 1620 is made of sheet steel about 0.050 to about 0.750 inches thick, although thicknesses outside this range are also possible. Preferably, hoop member 1620 includes access openings 1630 for connecting a resilient member to rim 1610.

Figure 17:
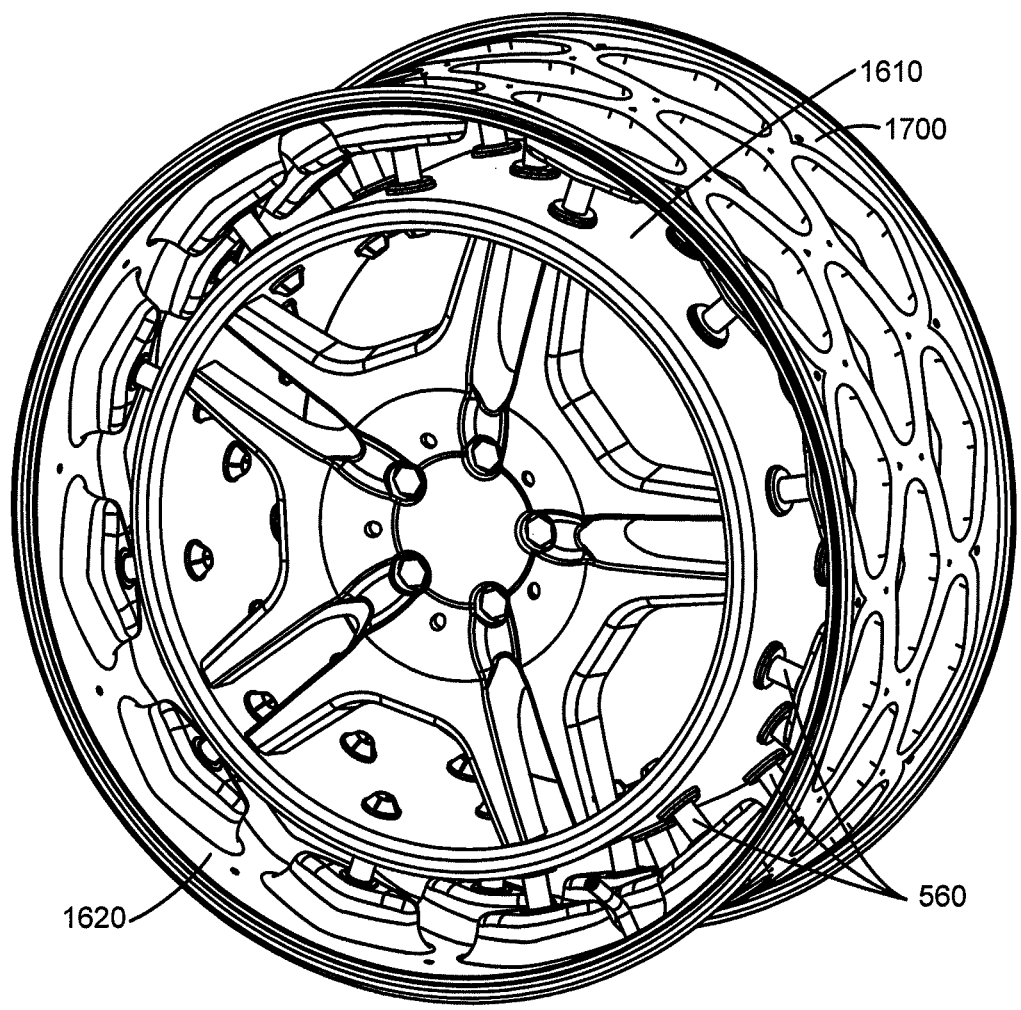
FIG. 17 shows a stage in the assembly of the wheel assembly of FIG. 15, in accordance with one embodiment.

FIG. 17 shows another stage in the assembly of wheel assembly 1500. In FIG. 17, a resilient member 1700 has been placed over hoop member 1620, and tying members 560 have been engaged with rim 1610. In some embodiments, the outer surface of resilient member 1700 may also be a traction surface for the wheel assembly. In that case, assembly is substantially complete at this stage. Resilient member 1700 may be configured with a tread pattern on its outer surface, using any suitable pattern.

In other embodiments, a traction layer may be affixed around the outer surface of resilient member 1700. Using two separate pieces may allow, for example, for resilient member 1700 and the traction layer to have different elastic and wear properties. The two pieces may be affixed together by any suitable means, including solvent bonding, chemical bonding, an adhesive, thermal welding, stitching, or another means. When a separate traction layer is used, resilient member 1700 may include a valve and channels for distributing compressed air or other gas from the valve to hollow spaces behind tying members 560. This technique may facilitate assembly of wheel assembly 1500 by urging tying members 560 toward rim 1610. Once assembly is complete, the hollow spaces may be left pressurized, the pressure may be relieved, or the hollow spaces may be evacuated.

Figure 18:
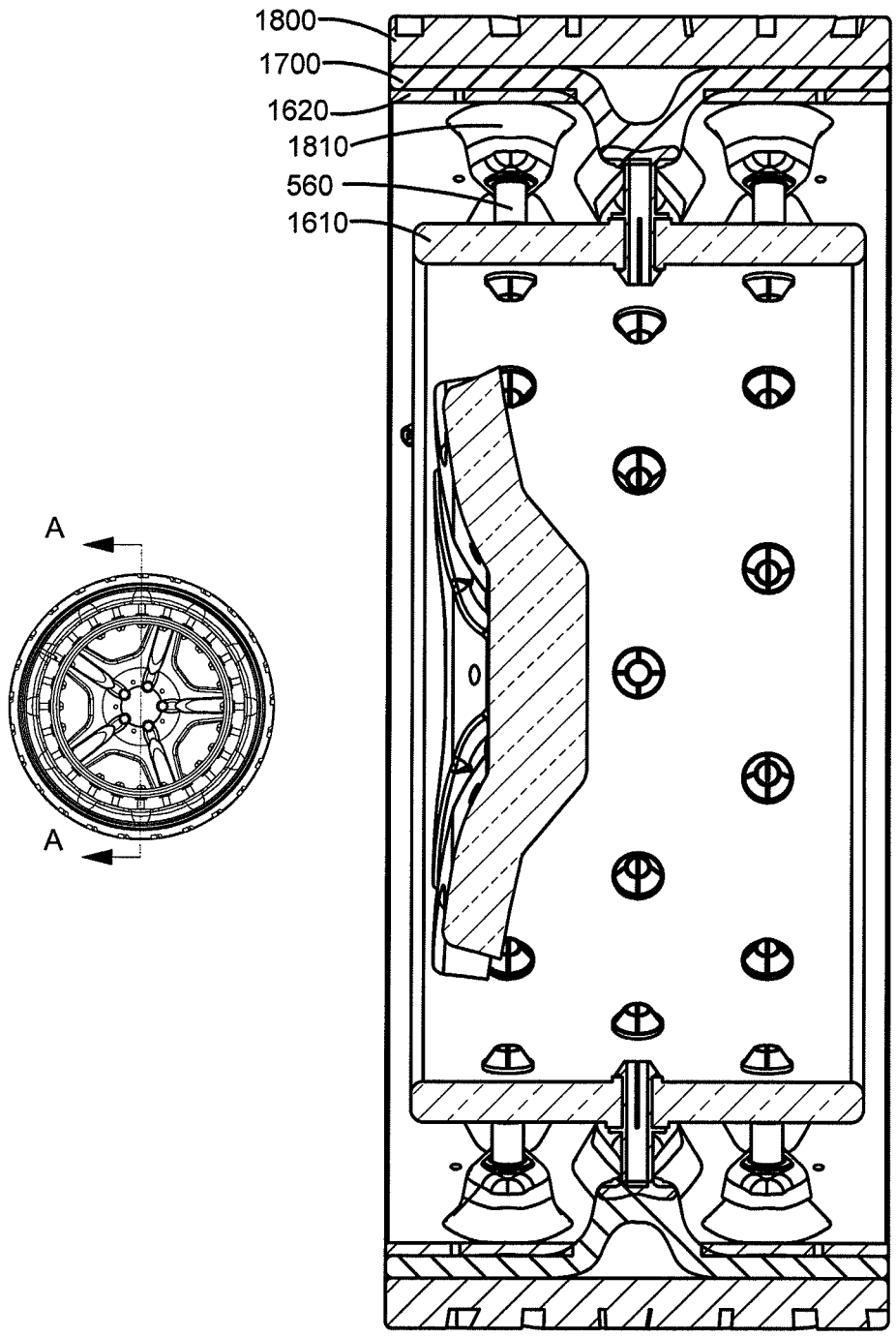
FIG. 18 shows a cross section of the wheel assembly of FIG. 15 in its assembled state.

FIG. 18 shows a cross section view of wheel assembly 1500 in its assembled state, according to an embodiment. Hoop member 1620 surrounds rim 1610. Resilient member 1700 surrounds and is in contact with hoop member 1620. Tying members 560 connect resilient member 1700 to rim 1610, pulling protruding portions 1810 through openings in hoop member 1620. In this embodiment, a traction layer 1800 surrounds resilient member 1700.

Figure 19:
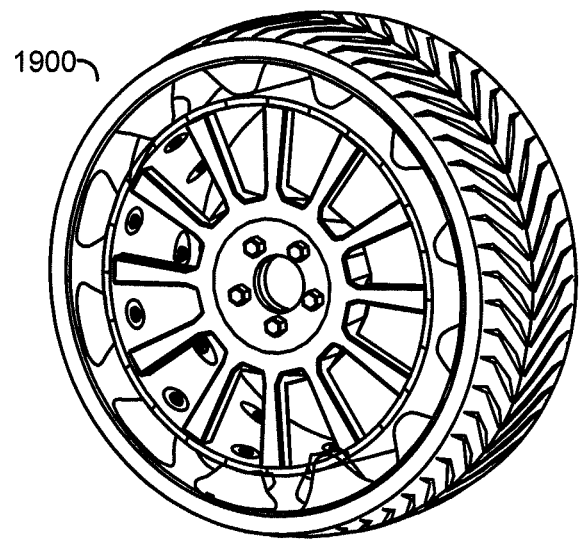
FIG. 19 shows a wheel assembly in accordance with another embodiment.
Figure 20:
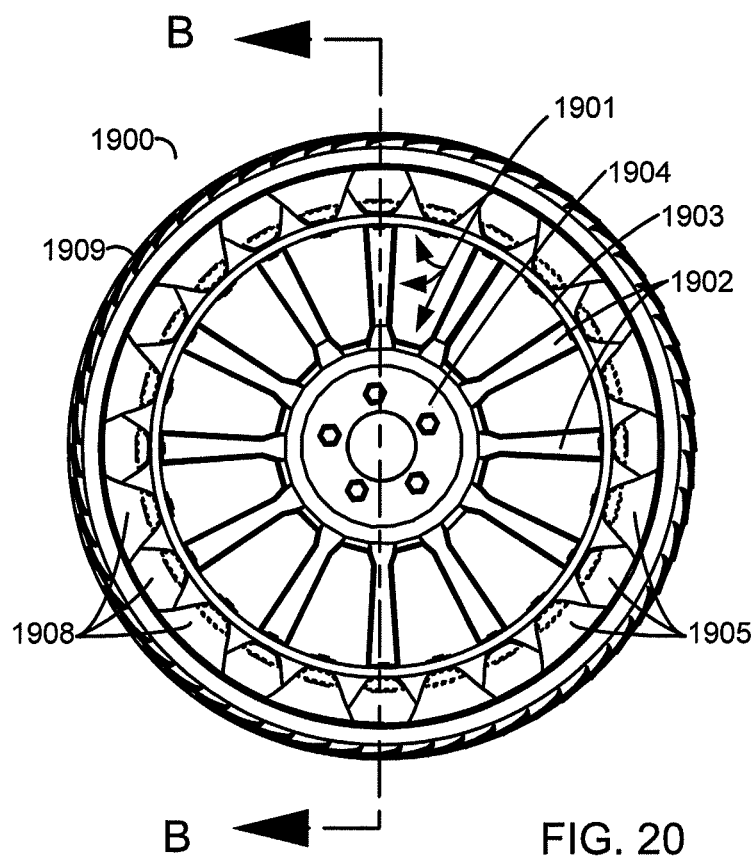
FIG. 20 shows orthogonal views of the wheel assembly of FIG. 19.
Figure 21:
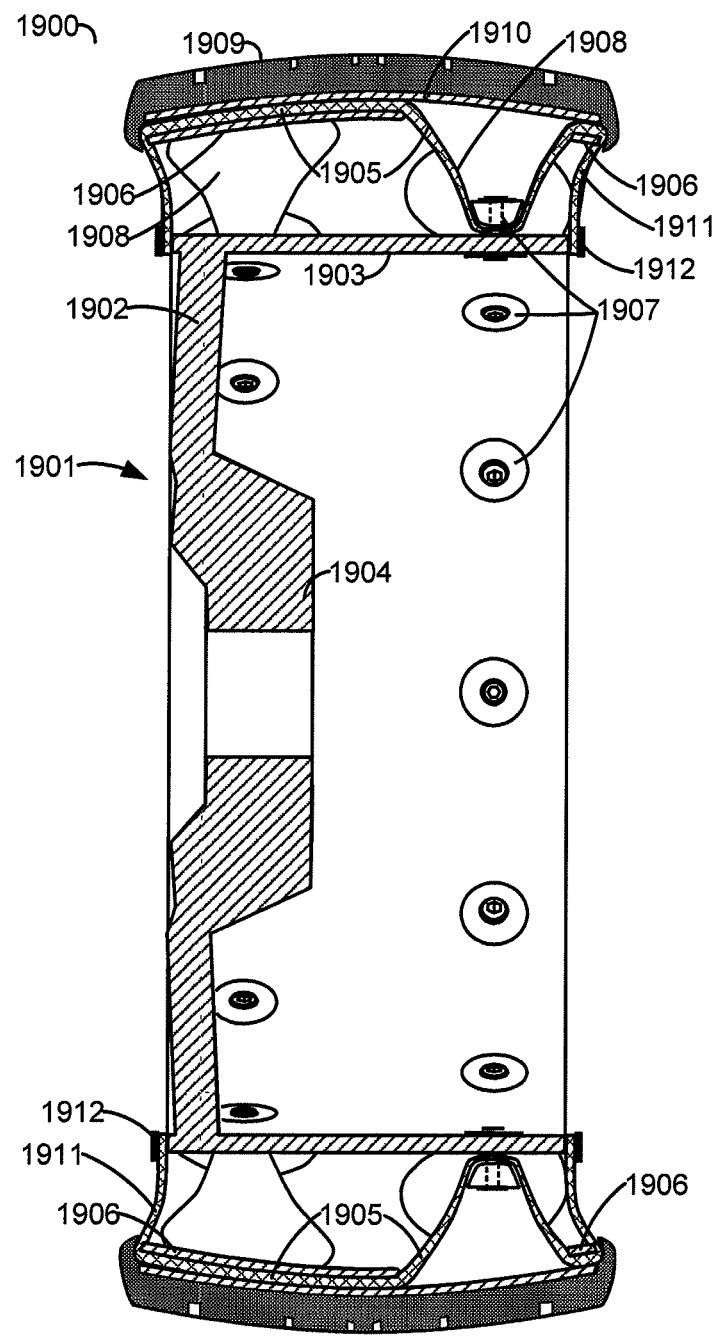
FIG. 21 shows a cross section view of the wheel assembly of FIG. 19.

FIGS. 19-21 show a wheel assembly 1900 in accordance with another embodiment. In this embodiment, rim 1901 comprises a number of spoke-like features 1902 connecting a peripheral portion 1903 with a central hub 1904. As compared with the example rim 200 shown in FIG. 2, rim 1901 comprises a greater number of spoke-like features 1902 that are thinner than the corresponding features of rim 200, and hub 1904 is of a smaller diameter than the corresponding feature of rim 200. This arrangement may enable more of the mass of the rim to reside closer to the axis of rotation, so that the rim has a lower rotational moment of inertia, enabling better acceleration of a vehicle on which rim 1901 is used.

In example wheel assembly 1900, a resilient member 1905 protrudes through openings in a hoop member 1906, and each protrusion is connected with rim 1901 by a tying member 1907. Tying members 1907 are depicted as including a smooth nut drawn toward peripheral portion 1903 of rim 1901 by a screw, but other kinds of tying members may be used, including, for example, tying members 560 shown in FIG. 7. Hoop member 1906 may be made of any suitably strong material, for example a metal such as steel or aluminum, or a composite material such as a composite comprising carbon fibers. Protruding portions 1908 of resilient member 1905 may be formed in various ways. For example, resilient member 1905 may have a uniform thickness in its relaxed state, and the protruding portions 1908 formed when tying members 1907 are engaged with rim 1901. Alternatively, protruding portions 1908 may be molded or otherwise formed into resilient member 1905, so that in their relaxed state, they protrude some distance through hoop member but not as far as when tying members 1907 are engaged with rim 1901, so that the engagement of tying members 1907 with rim 1901 further elongates the protruding portions 1908, and leaves the tying members 1907 in tension after assembly.

In example wheel assembly 1900, two circumferential rows of tying members 1907 are used to connect resilient member 1905 to rim 1901, compared with three rows used in the embodiments previously described. Any suitable number of rows may be used, with any suitable number of tying members 1907 in each row. A traction layer 1909 is further disposed around hoop member 1906. FIG. 20 shows orthogonal views of wheel assembly 1900.

FIG. 21 shows a cross section view of example wheel assembly 1900. The cross section view clearly illustrates another feature of this embodiment. Hoop member 1906 is curved in cross section, so that hoop member 1906 and traction layer 1909 are crowned. Wheel assembly 1900 thus has a somewhat larger diameter at its center than at its edges. The degree of curvature of hoop member 1906 may be selected in accordance with the intended use of a particular wheel assembly. For example, in a wheel assembly for use on a large truck, little or no curvature or crowing may be provided. In a wheel assembly for use on a motorcycle, the curvature or crowing may be quite pronounced, so as to enable high maneuverability of the motorcycle. The peripheral portion of rim 1901 may also be curved or crowned in cooperation with the curvature or crowning of hoop member 1906.

Optionally, a relatively rigid outer hoop member 1910 may be positioned around the outside of resilient member 1905. Outer hoop member 1910 may be made of any suitably strong material, for example a metal such as steel or aluminum, or a composite material, such as a composite comprising carbon fibers. Outer hoop member 1910 may serve to support traction layer 1909 substantially uniformly, including over the openings in hoop member 1906, so as to discourage uneven wear of traction layer 1909.

Also optionally, a resilient sidewall 1911 (shown only in FIG. 21) may be provided. Preferably, sidewall 1911 is made of a material with a high elasticity, so that upon any deformation, sidewall 1911 can return to its original shape with minimal energy loss. Sidewall 1911 may be sealed to edge 1912 of rim 1901, thus preventing the buildup of dirt, mud, or debris within the space between rim 1901 and hoop member 1906. In some embodiments, sidewall 1911 and resilient member 1905 may be formed as a single piece. In some embodiments including sidewall 1911, the space between rim 1901 and hoop member 1906 may be at atmospheric pressure, or a pressure lower or higher than atmospheric pressure. Note, however, that even in an embodiment with positive pressure, rim 1901 is still suspended within the wheel assembly by resilient member 1905, so that the wheel assembly continues to function if pressure is lost for any reason.

A wheel assembly in accordance with some embodiments avoids the use of a sidewall, and therefore avoids energy dissipation in the deformation of a sidewall. It is also hoped that the unique dynamics of the wheel assembly will lead to further efficiency gains. Furthermore, the wheel assembly provides compliance for accommodating some road surface roughness without the requirement that a tire remain inflated. Thus, a common tire failure mode is avoided.

Figure 22:
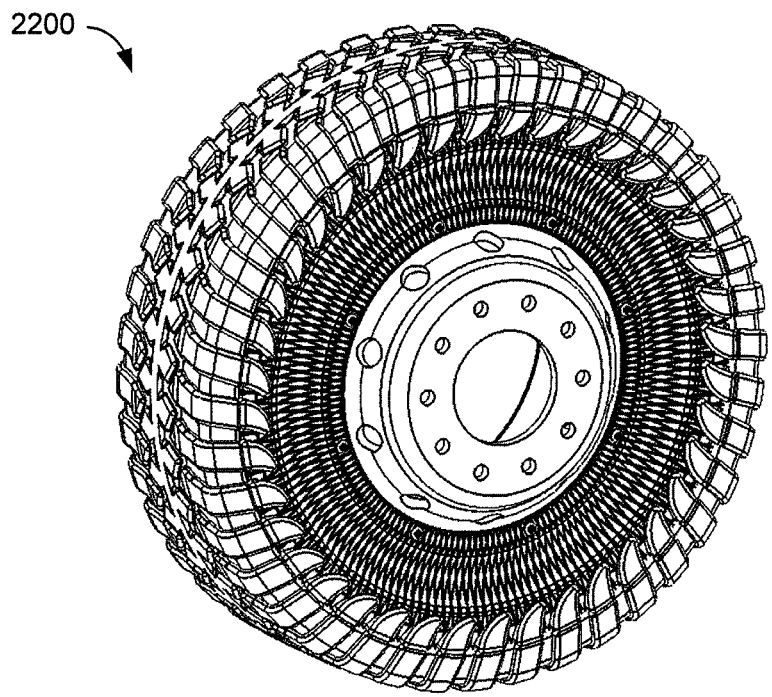
FIG. 22 shows a wheel assembly in accordance with another embodiment.

FIG. 22 shows a wheel assembly 2200 in accordance with another embodiment. While wheel assembly 2200 is illustrated as large and suitable for off-road use, principles of its construction are applicable to a wide variety of wheel assemblies, for example suitable for passenger cars, trucks, carts, vans, motorcycles, scooters, tractors, wheelbarrows, bicycles, and other kinds of motorized or nonmotorized vehicles or conveyances. Wheel assembly may be of a size suitable for its intended application, for example having a diameter between 12 and 48 inches, and a width between 1 and 16 inches, although in some applications, a wheel according to embodiments may be larger or smaller than these ranges.

Figures 23A, 23B:
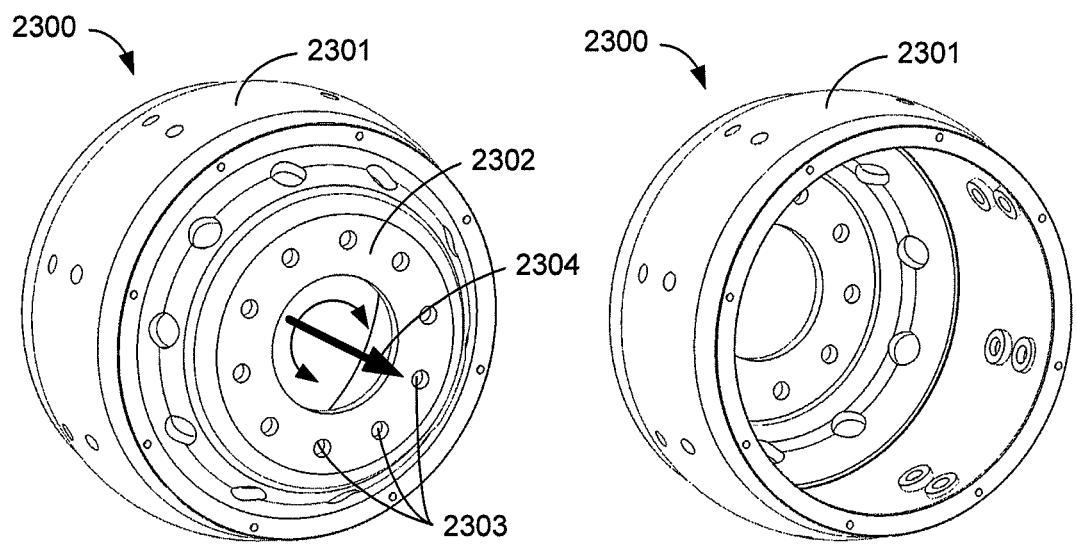
FIGS. 23A and 23B show front and rear oblique views of a rim usable in the wheel assembly of FIG. 22.

FIGS. 23A and 23B show front and rear oblique views of a rim 2300 usable in wheel assembly 2200. Rim 2300 includes a rim peripheral portion 2301 and a hub portion 2302. Rim peripheral portion 2301 may be round, as shown in FIGS. 23A and 23B, but in some embodiments may also have a polygonal or other shape. Hub portion 2302 is configured to mount on a vehicle axle, for example using mounting holes 2303. Rim 2300 defines a rotational axis 2304, about which rim 2300 rotates during motion of the vehicle or other conveyance on which wheel assembly 2200 may be mounted. Rim 2300 is preferably made of a rigid, durable material, such as aluminum, steel, magnesium, titanium, or another metal or metal alloy. In some applications, polymers or composites may be used, for example carbon fiber composites.

In one embodiment, rim 2300 is made of cast aluminum with some surface machined so as to maintain certain manufacturing tolerances. Many different materials are possible.

Figure 24:
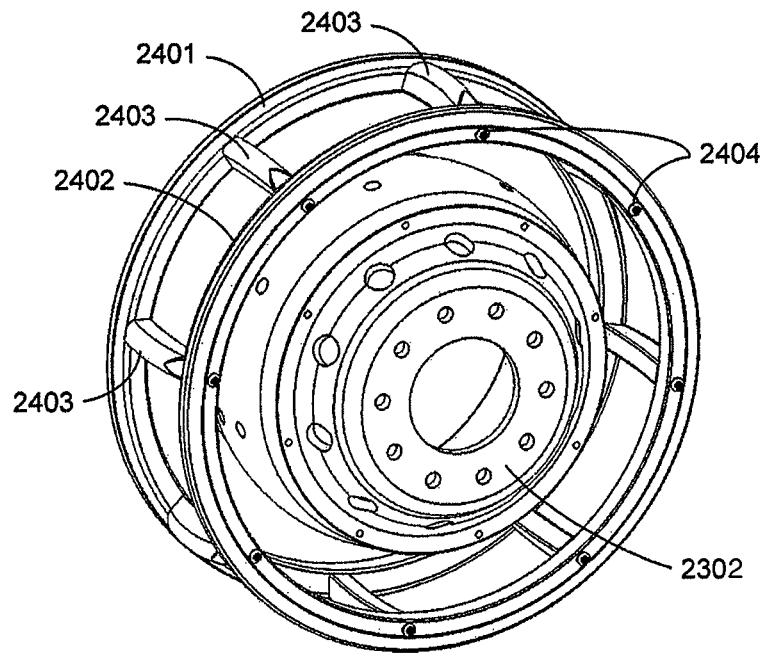
FIG. 24 shows a round rib surrounding and radially spaced apart from the rim of FIG. 23.

FIG. 24 shows a round rib 2401 surrounding and radially spaced apart from rim 2300. In the embodiment shown, a second round rib 2402 is also present, but it will be recognized that in some embodiments, for example in a wheel assembly designed for use on a bicycle, only one round rib may be present. The two round ribs 2401 and 2402 are connected at intervals around their periphery by bridging members 2403. Round ribs 2401 and 2402 are preferably made of a rigid or nearly rigid durable material, for example aluminum, steel, Magnesium, titanium, or another metal or metal alloy. In some applications, polymers or composites may be used, for example carbon fiber composites. Many different materials are possible. While in the embodiment of FIG. 24, round ribs 2401 and 2402 are spaced from each other by about the width of rim 2300, this is not a requirement. Round ribs 2401 and 2402 may be spaced more closely, or may even be spaced further apart, so that both round ribs 2401 and 2402 are disposed beyond their respective sides of rim 2300. In that case, round ribs 2401 and 2402 would still be considered to surround rim 2300. Ribs 2401 and 2402 and bridging members 2403 may be fabricated separately and assembled using fasteners such as screws 2404, or may be fabricated as a monolithic part.

Figure 25:
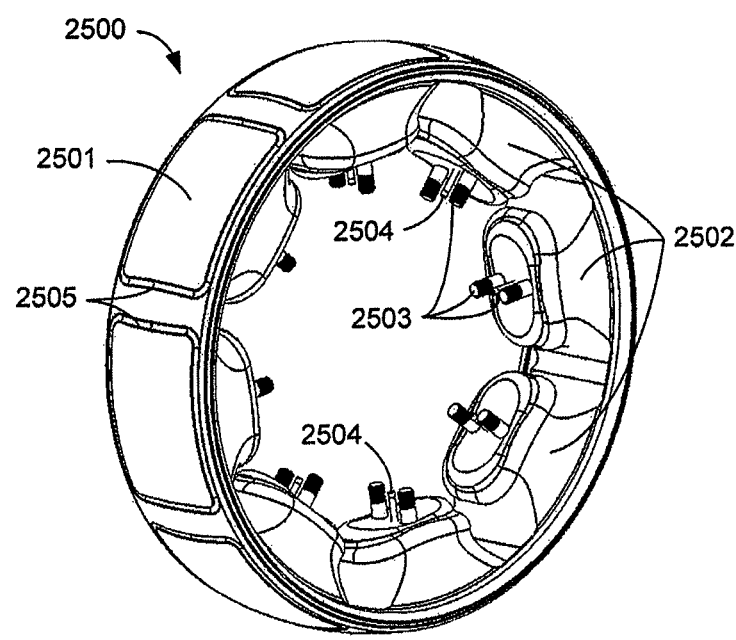
FIG. 25 illustrates a resilient member in accordance with embodiments.

FIG. 25 illustrates a resilient member 2500 in accordance with embodiments. Resilient member 2500 may be made of materials similar to those suggested above for resilient member 500. Resilient member 2500 includes a resilient member peripheral portion 2501 and a plurality of protruding portions 2502. While resilient member 2500 includes eight protruding portions 2502, more or fewer may be provided. For example, in some embodiments, a single, continuous inner portion of resilient member 2500 may extend toward rim 2300. Protruding portions 2502 are shown in a fully protruded state, but may not be in such a state immediately upon fabrication of resilient member 2500, as will be explained in more detail below. Resilient member 2500 may be made, for example, using an overmolding process such that additional components can be enclosed or embedded within resilient member 2500. For example, bolts 2503, valve stems 2504, and other components may be included, as described below. Registration features such as grooves 2505 may also be provided.

Figure 26:
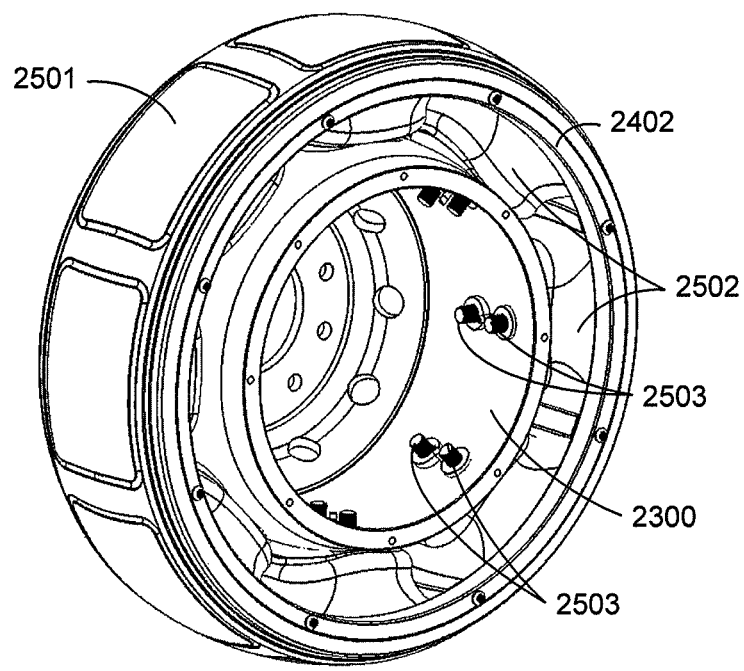
FIG. 26 shows the resilient member of FIG. 25 in place around the ribs of FIG. 24.

FIG. 26 shows resilient member 2500 in place around ribs 2401 and 2402. Resilient member peripheral portion 2501 engages ribs 2401 and 2402, and protruding portions 2502 protrude between ribs 2401 and 2402, toward rim 2300. Ribs 2401 and 2402 hold resilient member peripheral portion 2501 away from rim 2300. Bolts 2503 protrude through holes in rim peripheral portion 2301, although in an actual process of assembly, protruding portions 2502 may not yet be distended sufficiently for bolts 2503 to reach rim 2300. In some embodiments, the outer surface of resilient member 2500 may also be the surface on which the wheel rolls. In other embodiments, described further below, additional components may surround resilient member 2500.

Figure 27:
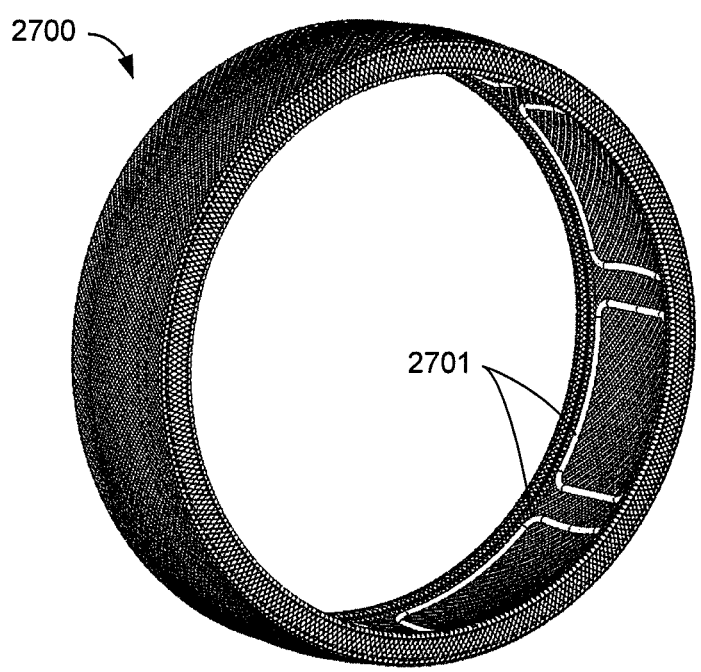
FIG. 27 shows a round hoop member, in accordance with embodiments.

FIG. 27 shows a round hoop member 2700, in accordance with embodiments. Hoop member 2700 is preferably made of a very strong, rigid or nearly rigid material. In some embodiments, hoop member 2700 may be made of a metal or metal alloy, or a composite. In a preferred embodiment, hoop member 2700 is made of a carbon fiber composite for exceptional strength and low weight. In some embodiments, pre-tensioned reinforcing members may be embedded within hoop member 2700. For example, pre-tensioned carbon fiber rods or other reinforcing materials may be embedded circumferentially within hoop member 2700. Registration features such as raised tracks 2701 may be provided, for engaging with resilient member 2500.

FIG. 28 shows hoop member 2700 disposed around and in contact with resilient member 2500, which in turn surrounds rim 2300. Hoop member 2700 may be affixed to resilient member 2500, for example using an adhesive, solvent bonding, heat welding, or another suitable technique. Registration features in hoop member 2700 and resilient member 2500 may also engage, to aid in alignment of the components. For example, tracks 2701 in hoop member 2700 may engage with grooves 2505 in resilient member 2500. Many other kinds of registration features may be envisioned. For example, resilient member 2500 may have raised features that register with recesses in hoop member 2700, or each of the components may have a combination of raised and recessed features.

FIG. 29 illustrates a traction layer 2900, in accordance with embodiments. Traction layer 2900 is preferably made of a hard, durable rubber or other semi-flexible material. In one embodiment, traction layer 2900 is made of tire rubber. In some embodiments, traction layer 2900 may be impregnated with a filler or fillers. For example, traction layer 2900 may be impregnated with carbon nanotubes. Traction layer 2900 may include various fillers or reinforcing agents or structures. Traction layer 2900 is shown with a particular tread pattern, but other tread patterns may be used, or traction layer 2900 may be formed without a tread pattern.

Traction layer 2900 may have a generally uniform thickness (other than the tread pattern), but this is not a requirement, and other configurations are possible. For example, the center of traction layer 2900 may be made thicker than the edges.

FIG. 30 shows traction layer 2900 disposed around and in contact with hoop member 2700 (which is no longer visible in FIG. 30). Traction layer 2900 is preferably securely bonded to hoop member 2700 using a durable adhesive, solvent bonding, heat welding, or another suitable technique. Protruding portions 2502 of resilient member 2500 are also shown as fully distended, and nuts 3001 have been placed on bolts 2503.

Figure 31:
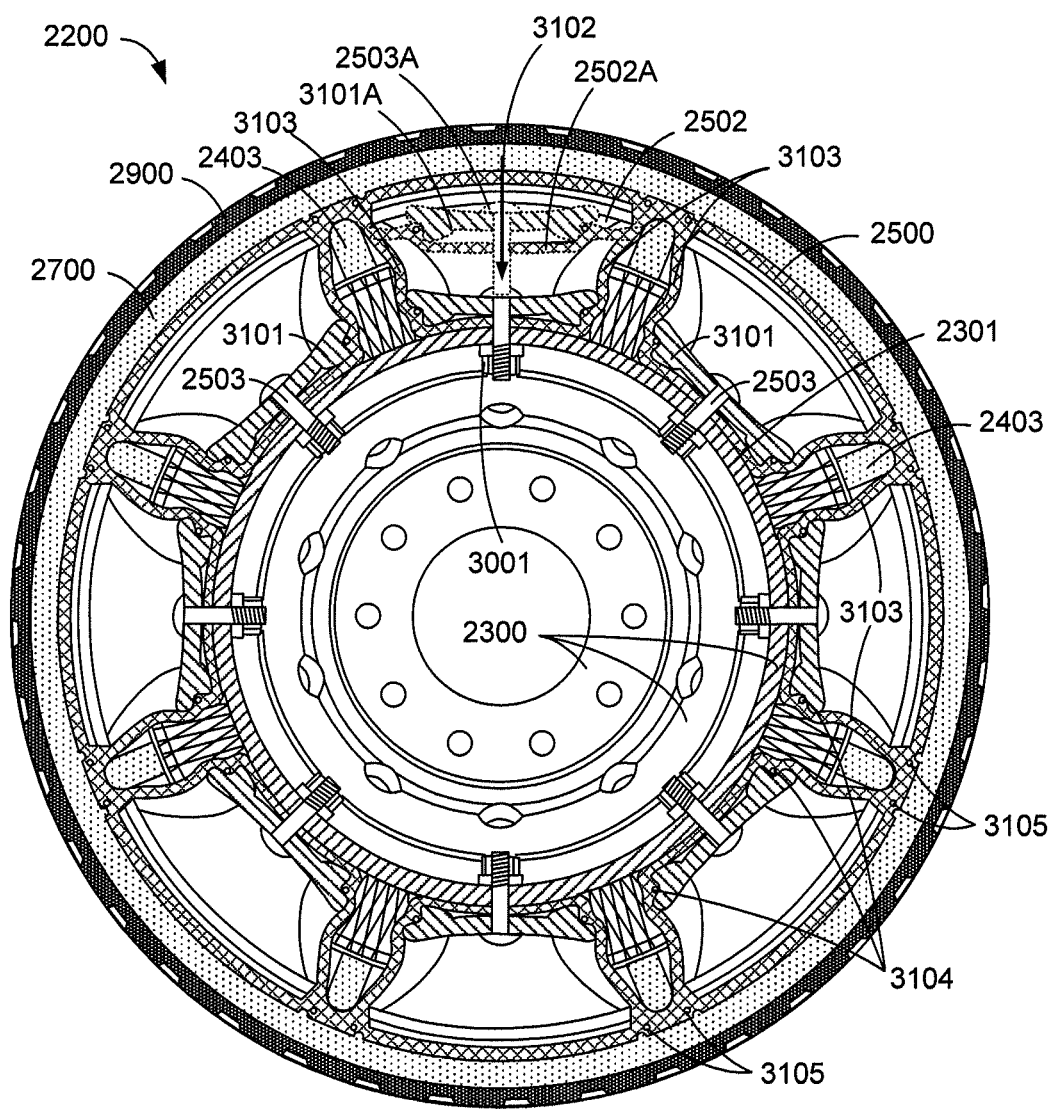
FIG. 31 shows a cross section view of the wheel assembly of FIG. 22.

FIG. 31 shows a cross section view of wheel assembly 2200, in the plane indicated in FIG. 30. FIG. 31 illustrates several aspects of the assembly and operation of wheel assembly 2200. As was mentioned above, protruding portions 2502 of resilient member 2500 are, upon fabrication of resilient member 2500, much closer to peripheral portion 2501 of resilient member 2500 than is generally shown in the figures. For example, as is shown in FIG. 30, a clamping plate 3101 and a bolt 2503 may be molded into resilient member 2500 at each location from which a protruding portion will extend. In FIG. 31, clamping plate 3101A and bolt 2503A are shown in broken lines nearer their position as it would be when protruding portion 2502A is in its undistended state.

After wheel assembly 2200 is partially assembled, for example after at least hoop member 2700 is disposed around resilient member 2500, protruding portions 2502 are distended so that bolts 2503 extend through the holes in rim peripheral portion 2301. This motion is shown for clamping plate 3101A, bolt 2503A, and protruding portion 2502A by arrow 3102. The distention may be accomplished by inflating protruding portions 2502 with compressed air via valve stems 2504 (not visible in FIG. 31). Once a protruding portion 2502 is inflated, nuts 3001 may be put in place and tightened, to hold the respective protruding portion 2502 in its distended condition. It will be appreciated that in this condition, the sidewalls 3103 of each protruding portion 2502 are under significant tension. The combined forces exerted by sidewalls 3103 resiliently hold rim 2300 in position in relation to ribs 2401 and 2402 (not visible in FIG. 31). When wheel assembly 2200 is loaded, those protruding portions above the axle resist further elongation, and support the vehicle weight. Thus, the functioning of wheel assembly 2200 is not dependent on maintaining any inflation pressure, although the spaces formed by protruding portions 2502 may be left at elevated pressure, may be allowed to equilibrate with atmospheric pressure, or may be partially evacuated, so that they are maintained at a partial vacuum with respect to the atmosphere.

Resilient member 2500 with embedded clamping plates 3101 and bolts 2503 may be fabricated by overmolding. That is, clamping plates 3101 and bolts 2503 may be placed in a mold, and the resilient material of resilient member 2500 molded around them. Resilient member 2500 is thus preferably a continuous member. Embedded reinforcements 3104 may be provided near each clamping plate 3101 to strengthen resilient member 2500 and prevent damage during the fabrication process. Embedded reinforcements 3104 may be, for example, stiff wire loops that surround each clamping plate 3101. Additional reinforcements 3105 may be placed at other locations within resilient member 2500. Embedded reinforcements 3104 and 3105 are also preferably embedded in resilient member 2500 in the overmolding process.

Clamping plates 3101 may be made of any suitably strong material, for example a metal or composite, and may have rounded edges to prevent damage to resilient member 2500. It will be appreciated that clamping plates 3101 and bolts 2503 are merely examples of the many kinds of tying members that could be used to connect protruding portions 2502 to rim peripheral portion 2301. Other kinds of tying members that could be used include snapping features, or unitary parts each of which includes the features of both a clamping plate 3101 and a bolt 2503.

Clamping plates 3101 may also provide a limit on the travel of hoop member 2700 with respect to rim 2300. For example, the upturned ends of one of clamping plates 3101 may contact resilient member 2500 or hoop member 2700 when an extreme bump or obstruction is encountered. This travel limit may prevent damage to resilient member 2500, and may also enable wheel assembly 2200 to operate in a damaged condition if necessary. Alternatively, the radial spacing of rim 2300 and ribs 2401 and 2402 may provide a travel limit. That is, ribs 2401 and 2402 may contact rim 2300 during extreme events, preventing damage to resilient member 2500. Ribs 2401 and 2402 may deform to some degree during extreme events as well, contributing the overall compliance of the vehicle suspension.

Figure 32:
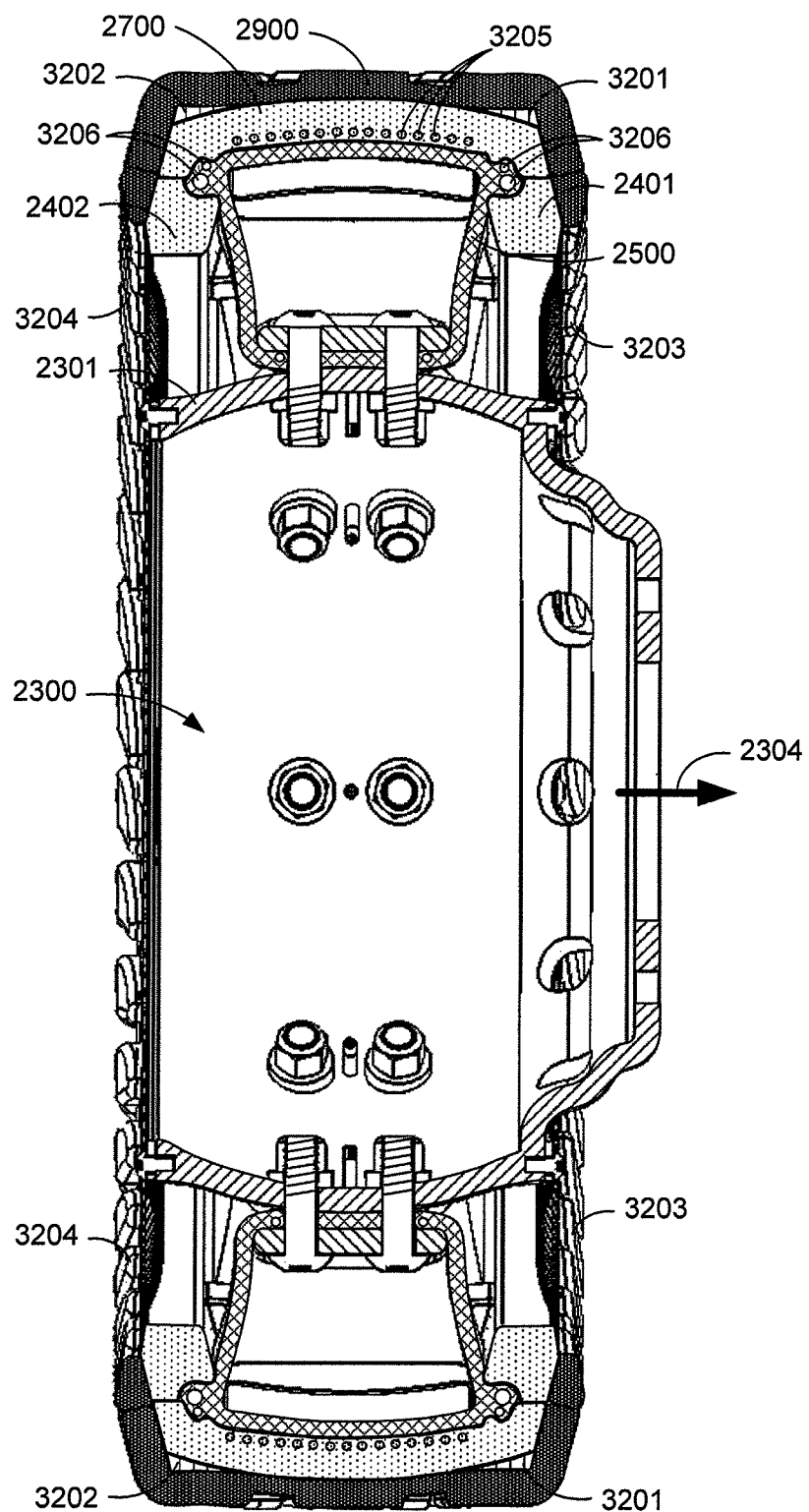
FIG. 32 illustrates another cross section the wheel assembly of FIG. 22.

FIG. 32 illustrates another cross section of wheel assembly 2200, in the plane indicated in FIG. 30. As can be seen in FIG. 32, either or both of rim peripheral portion 2301 or hoop member 2700 may be crowned across its width (in the direction or rotation axis 2304). FIG. 32 also shows the inclusion of optional wedge members 3201 and 3202 interposed between traction layer 2900 and hoop member 2700, near the respective edges of hoop member 2700. Wedge members 3201 and 3202 are shown as having a wedge-shaped cross section, and are round so as to encircle hoop member 2700. Wedge members 3201 and 3202 are preferably made of a tough, semi-flexible material such as belted rubber, and may enhance cornering characteristics of a vehicle on which wheel assembly 2200 is mounted. Wedge members 3201 and 3202 may include reinforcements, such as reinforcing fibers. In some embodiments, wedge members 3201 and 3202 are made of Kevlar® belted natural or synthetic rubber.

Also shown in FIG. 32 are optional side curtains 3203 and 3204. Side curtains 3203 and 3204 may be included to prevent the accumulation of dirt, mud, or other debris in wheel assembly 2200. In some embodiments, side curtains 3203 and 3204 are very flexible and highly elastic, and do not contribute significantly to supporting the vehicle on which wheel assembly 2200 is mounted, so that any distortion of side curtains 3203 and 3204 that occur during operation of the vehicle do not dissipate significant energy. For example, side curtains 3203 and 3204 may be made of a natural or synthetic rubber. In some embodiments, side curtains 3203 and 3204 are sufficiently stiff that the space between the sidewalls can be partially evacuated.

FIG. 32 also illustrates pre-tensioned reinforcing members 3205 embedded within hoop member 2700. Pre-tensioned reinforcing members 3205 may be made, for example, of carbon rods, wound under tension around the form used to fabricate hoop member 2700. Other reinforcements 3206 maybe provided in resilient member 2500. For example, stiffening wires may help to define beads for secure engagement with ribs 2401 and 2402.

Figure 33:
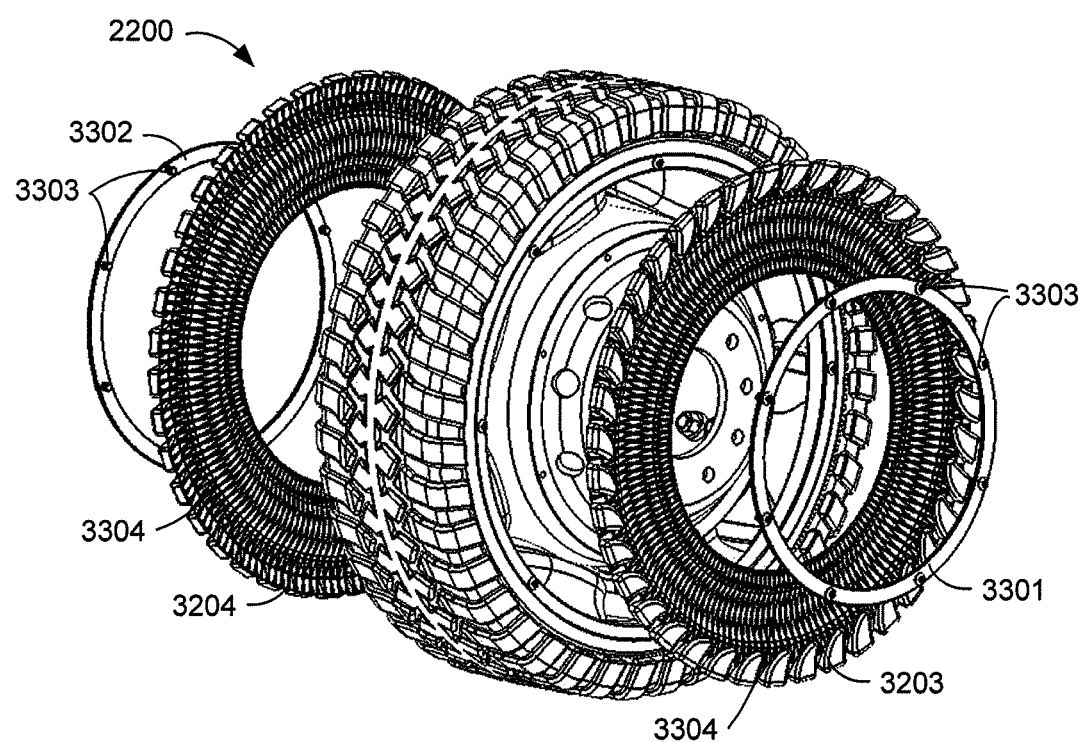
FIG. 33 shows the assembly of side curtains onto the wheel assembly of FIG. 22.

FIG. 33 shows the assembly of side curtains 3203 and 3204 onto wheel assembly 2200. Example side curtains 3203 and 3204 are annular, so as to fit around rim 2300. Side curtains 3203 and 3204 may be secured to rim 2300 using metal rings 3301 and 3302, fixed to rim 2300 by screws 3303. In some embodiments, side curtains 3203 and 3204 may be removable, and wheel assembly 2200 may be disassemblable for service.

Side curtains 3203 and 3204 may also include reinforcing fibers 3304 visible in FIG. 33. For example, the reinforcing fibers may be made of fiberglass, Kevlar®, or another material.

In some embodiments, the reinforcing fibers are oriented in an opposing angular configuration, such that fibers near the outside surface of each side curtain are angled with respect to fibers near the inside surface of the side curtain.

The invention has now been described in detail for the purposes of clarity and understanding. However, those skilled in the art will appreciate that certain changes and modifications may be practiced within the scope of the appended claims.

What is claimed is:

1. A wheel assembly, comprising:
 a rim having a rim peripheral portion and defining an axis of rotation;
 a round rib surrounding and radially spaced apart from the rim;
 a resilient member disposed around the rim and engaging the round rib, the resilient member including a resilient member peripheral portion and one or more protruding portions, wherein the resilient member peripheral portion is held apart from the rim by the round rib, and the one or more protruding portions protrude radially toward the rim; and a plurality of tying members, each tying member connecting one of the one or more protruding portions of the resilient member to the rim, such that the rim is resiliently held in relation to the round rib at least in part by tension in the one or more protruding portions of the resilient member.

2. The wheel assembly of claim 1, wherein the wheel assembly comprises two round ribs, the one or more protruding portions of the resilient member protruding between the two round ribs radially toward the rim.

3. The wheel assembly of claim 2, further comprising a round hoop member surrounding and in contact with the resilient member.

4. The wheel assembly of claim 3, wherein the round hoop member is crowned.

5. The wheel assembly of claim 3, further comprising a traction layer surrounding and in contact with the round hoop member.

6. The wheel assembly of claim 5, wherein:
the round hoop member has two outer edges separated by a width of the round hoop member, the width being measured in the direction of the axis of rotation;
and wherein the wheel assembly further comprises two wedge members interposed between the round hoop member and the traction layer proximate the respective edges of the round hoop member, each wedge member being circular and having a wedge-shaped cross section.

7. The wheel assembly of claim 5, further comprising a flexible annular side curtain connected to one of the ribs and to the rim.

8. The wheel assembly of claim 5, further comprising a pair of flexible annular side curtains, each connected to a respective rib and to a respective side of the rim.

9. The wheel assembly of claim 8, wherein each side curtain includes reinforcing fibers.

10. The wheel assembly of claim 9, wherein the reinforcing fibers are in an opposing angled configuration.

11. The wheel assembly of claim 8, wherein the space between the side curtains is held below atmospheric pressure.

12. The wheel assembly of claim 5, further comprising a plurality of pre-tensioned reinforcing members embedded within the round hoop member.

13. The wheel assembly of claim 12, wherein the pre-tensioned reinforcing members comprise carbon fiber.

14. The wheel assembly of claim 5, wherein the two round ribs are connected at intervals, and the one or more protruding portions of the resilient member protrude between the ribs and between the connections of the two ribs.

15. A method of constructing a wheel assembly, the method comprising:
providing a rim, the rim having a rim peripheral portion and defining an axis of rotation;
providing a round rib and disposing it around and radially spaced apart from the rim;
providing a resilient member having a resilient member peripheral portion and one or more protruding portions and disposing the resilient member around the rim and engaging the round rib such that the resilient member peripheral portion is held apart from the rim by the round rib, and the one or more protruding portions protrude radially toward the rim;
providing a plurality of tying members; and
connecting the tying members to the one or more protruding portions of the resilient member and to the rim, such that the rim is resiliently held in relation to the round rib by tension in the one or more protruding portions of the resilient member.

16. The method of claim 15, further comprising:
providing a second round rib and disposing it around and radially spaced apart from the rim; and
disposing the resilient member such that the one or more protruding portions of the resilient member protrude between the two round ribs radially toward the rim.

17. The method of claim 16, further comprising:
providing a round hoop member; and
disposing the round hoop member around and in contact with the resilient member.

18. The method of claim 17, further comprising:
providing a traction layer; and
disposing the traction layer around and in contact with the round hoop member.

19. The method of claim 18, wherein the round hoop member has two outer edges separated by a width of the round hoop member, the width being measured in the direction of the axis of rotation, the method further comprising:
providing two wedge members, each wedge member being circular and having a wedge-shaped cross section; and
disposing the two wedge members between the round hoop member and the traction layer proximate the respective edges of the round hoop member.

20. The method of claim 18, further comprising:
providing a pair of flexible annular side curtains; and
connecting each side curtain to a respective rib and to a respective side of the rim.

21. The method of claim 20, further comprising at least partially evacuating the space between the side curtains.

22. The method of claim 18, further comprising embedding a plurality of pre-tensioned reinforcing members within the round hoop member.

23. A wheel assembly, comprising:
a rim defining an axis of rotation;
a round rib surrounding and radially spaced apart from the rim;
a resilient member disposed around the rim and engaging the round rib, the resilient member including a resilient member peripheral portion and an inner portion, wherein the resilient member peripheral portion is held apart from the rim by the round rib, and the inner portion extends radially toward the rim;
a plurality of tying members, each tying member connecting the inner portion of the resilient member to the rim, such that the rim is resiliently held in relation to the round rib at least in part by tension in the resilient member.

* * * * *